(12) United States Patent
Lu et al.

(10) Patent No.: US 10,849,063 B2
(45) Date of Patent: Nov. 24, 2020

(54) SYSTEM AND METHOD FOR CONTROLLING A WIRELESS NETWORK

(71) Applicant: Conversant Intellectual Property Management Inc., Ottawa (CA)

(72) Inventors: Xuejun Lu, Ottawa (CA); Nima Ahmadvand, Ottawa (CA)

(73) Assignee: Conversant Intellectual Property Management Inc., Ottawa (CA)

( * ) Notice: Subject to any disclaimer, the term of this patent is extended or adjusted under 35 U.S.C. 154(b) by 0 days.

(21) Appl. No.: 16/429,257

(22) Filed: Jun. 3, 2019

(65) Prior Publication Data

US 2020/0128478 A1 Apr. 23, 2020

Related U.S. Application Data

(63) Continuation of application No. 16/107,268, filed on Aug. 21, 2018, now Pat. No. 10,368,307, which is a continuation of application No. 14/627,218, filed on Feb. 20, 2015, now Pat. No. 10,080,188.

(60) Provisional application No. 61/945,496, filed on Feb. 27, 2014, provisional application No. 61/945,516, filed on Feb. 27, 2014.

(51) Int. Cl.
| | |
|---|---|
| *H04W 52/02* | (2009.01) |
| *H04W 52/26* | (2009.01) |
| *H04W 52/24* | (2009.01) |
| *H04B 17/309* | (2015.01) |
| *H04W 88/08* | (2009.01) |

(52) U.S. Cl.
CPC ...... *H04W 52/0206* (2013.01); *H04B 17/309* (2015.01); *H04W 52/241* (2013.01); *H04W 52/265* (2013.01); *H04W 88/08* (2013.01); *Y02D 70/00* (2018.01); *Y02D 70/1262* (2018.01); *Y02D 70/142* (2018.01); *Y02D 70/144* (2018.01); *Y02D 70/146* (2018.01); *Y02D 70/22* (2018.01)

(58) Field of Classification Search
CPC .... Y02D 70/142; Y02D 70/146; Y02D 70/22; Y02D 70/00; Y02D 70/1262; Y02D 70/144; H04W 88/08; H04W 52/265; H04B 17/309
USPC ........................................................ 370/252
See application file for complete search history.

(56) References Cited

U.S. PATENT DOCUMENTS

| | | | |
|---|---|---|---|
| 2005/0089005 A1* | 4/2005 | Sakoda ............ | H04W 74/0816 370/348 |
| 2007/0086406 A1* | 4/2007 | Papasakellariou .... | H04W 16/04 370/343 |

(Continued)

*Primary Examiner* — Chi Tang P Cheng
(74) *Attorney, Agent, or Firm* — Conversant IP Management Corp.

(57) ABSTRACT

In one embodiment, a method is performed by a wireless station. The method includes receiving from an access point (AP) a request for measurement of at least one link-quality parameter. The method further includes measuring the at least one link-quality parameter to generate a link-quality-parameter measurement. The method also includes determining, for the wireless station, an appropriate wireless-station category of a plurality of wireless-station categories. The plurality of wireless-station categories are defined based at least in part on the link-quality-parameter measurement. In addition, the method includes communicating with the AP in accordance with a transmission schedule corresponding to the plurality of wireless-station categories.

20 Claims, 10 Drawing Sheets

(56) References Cited

U.S. PATENT DOCUMENTS

2008/0070610 A1* 3/2008 Nishio ................ H04W 74/085
                                                                             455/509
2012/0230211 A1* 9/2012 Sandberg .............. H04L 5/0053
                                                                             370/252

\* cited by examiner

SYSTEM AND METHOD FOR CONTROLLING A WIRELESS NETWORK

CROSS-REFERENCE TO RELATED APPLICATIONS

The present application is a continuation of application Ser. No. 16/107,268, which is a continuation of application Ser. No. 14/627,218, filed Feb. 20, 2015 now U.S. Pat. No. 10,080,188, which claims the priority of U.S. Provisional Patent Application No. 61/945,496, filed Feb. 27, 2014 and U.S. Provisional Patent Application No. 61/945,516, filed Feb. 27, 2014. The disclosures of all of the above applications are hereby incorporated herein in their entirety by reference.

BACKGROUND

Technical Field

The present disclosure relates generally to network management and more particularly, but not by way of limitation, to systems and methods for controlling a wireless network.

History of Related Art

A typical wireless network includes an access point and a set of wireless stations. Some of the wireless stations may be closer to the access point than others (e.g., due to geographic dispersion). In addition, some of the wireless stations may be partially obstructed relative to the access point or be subject to environmental variables such as weather, atmospheric conditions, etc. The access point and/or the wireless stations may be powered by a limited power source such as a battery.

As the access point and the wireless stations communicate, such limited power sources may be progressively exhausted. Therefore, it can be beneficial to reduce power consumption in order to preserve each limited power source. However, as a general matter, the access point and the wireless stations cannot reduce power consumption without increasing a risk of transmission failure. For example, if the access point and/or the wireless stations were to transmit communications using reduced power levels, many of the communications may not reach their intended destinations. Such failures can be a result of geographic dispersion, obstructions, environmental factors, collisions, etc.

SUMMARY OF THE INVENTION

In one embodiment, a method is performed by a wireless station. The method includes receiving from an access point (AP) a request for measurement of at least one link-quality parameter. The method further includes measuring the at least one link-quality parameter to generate a link-quality-parameter measurement. The method also includes determining, for the wireless station, an appropriate wireless-station category of a plurality of wireless-station categories. The plurality of wireless-station categories are defined based at least in part on the link-quality-parameter measurement. In addition, the method includes communicating with the AP in accordance with a transmission schedule corresponding to the plurality of wireless-station categories.

In one embodiment, wireless station includes at least one transmitting/receiving unit and at least one processing unit. The at least one transmitting/receiving unit and the at least one processing unit are operable to implement a method. The method includes receiving from an access point (AP) a request for measurement of at least one link-quality parameter. The method further includes measuring the at least one link-quality parameter to generate a link-quality-parameter measurement. The method also includes determining, for the wireless station, an appropriate wireless-station category of a plurality of wireless-station categories. The plurality of wireless-station categories are defined based at least in part on the link-quality-parameter measurement. In addition, the method includes communicating with the AP in accordance with a transmission schedule corresponding to the plurality of wireless-station categories.

In one embodiment, a computer-program product includes a non-transitory computer-usable medium having computer-readable program code embodied therein. The computer-readable program code is configured, when executed by at least one processor, to receive from an access point (AP) a request for measurement of at least one link-quality parameter. The computer-readable program code is further configured, when executed by the at least one processor, to measure the at least one link-quality parameter to generate a link-quality-parameter measurement. In addition, the computer-readable program code is configured, when executed by the at least one processor, to determine, for a wireless station, an appropriate wireless-station category of a plurality of wireless-station categories. The plurality of wireless-station categories defined based at least in part on the link-quality-parameter measurement. The computer-readable program code is also configured, when executed by the at least one processor, to communicate with the AP in accordance with a transmission schedule corresponding to the plurality of wireless-station categories.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, power consumption by access points and wireless stations can be reduced in a fashion that significantly mitigates a risk of transmission failure due to collisions, environmental variables, and other factors. In a typical embodiment, a wireless access point can define criteria for categorizing a set of wireless stations served thereby. The criteria can be based, at least in part, on a link-quality-parameter measurement generated by each wireless station. Thereafter, the wireless access point and/or the wireless stations can use the categorizations to adapt transmission power levels.

Figure 1:
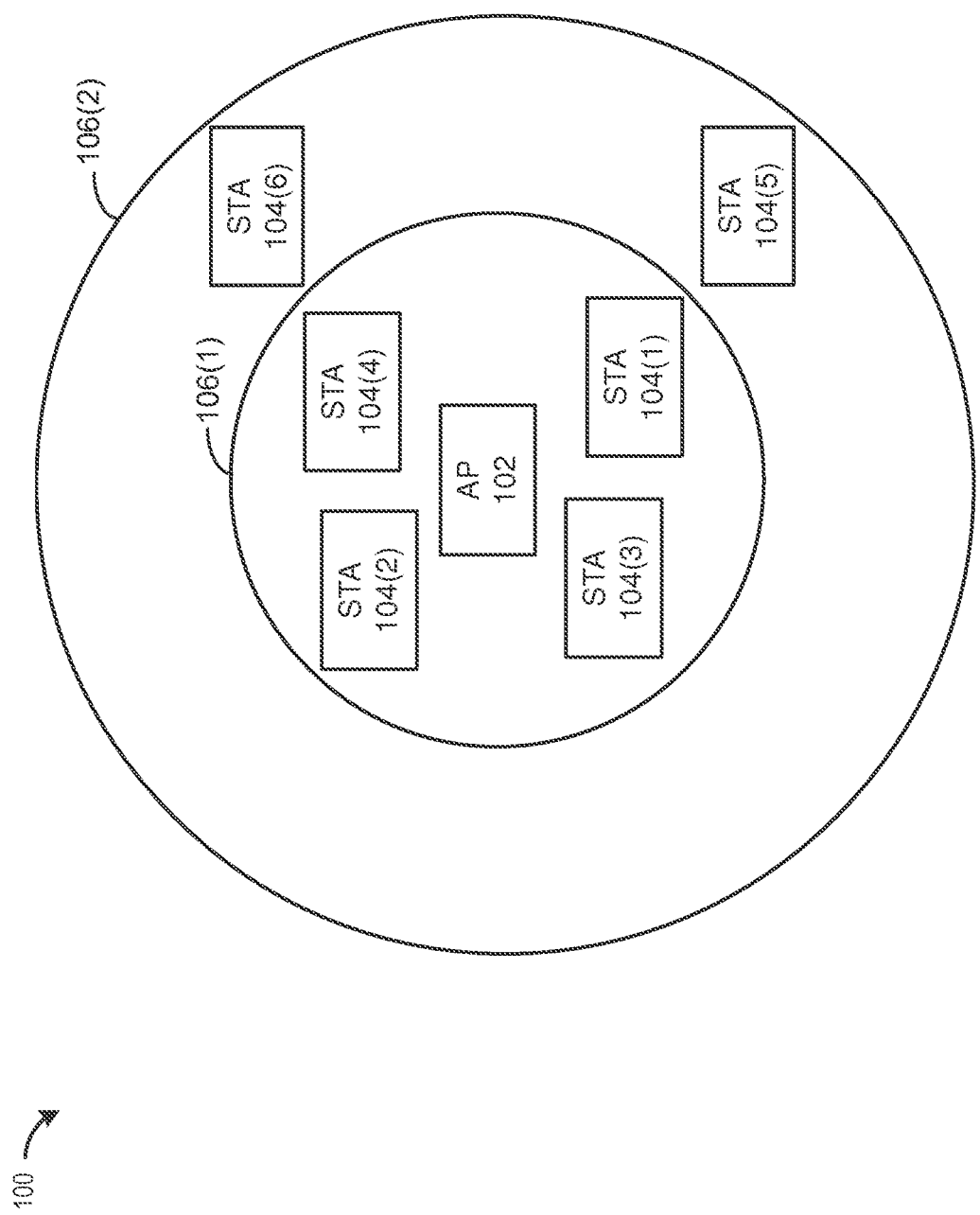
FIG. 1 illustrates an embodiment of a wireless network.

FIG. 1 illustrates an embodiment of a wireless network 100 that can be implemented, for example, as a basic service set (BSS) of a wireless LAN (WLAN). The wireless network 100 includes an access point (AP) 102 and wireless stations 104(1), 104(2), 104(3), 104(4), 104(5), and 104(6) (collectively, wireless stations 104). Each of the wireless stations 104 is typically associated with the AP 102. It should be appreciated that the particular wireless stations included within the set of wireless stations 104 can dynamically change as wireless stations associate or disassociate with the AP 102. In various embodiments, the AP 102 can be connected to a standalone router (e.g., via a separate wired or wireless network) or be an integral component of a router.

The AP 102 generally allows the wireless stations 104 to connect to a wide area network such as, for example, the Internet, using one or more wireless communication standards. The one or more wireless communication standards implemented by the wireless network 100 can include, but are not limited to, WLAN (e.g., IEEE 802.11 and related standards, HiperLAN, etc.), Wireless Metropolitan Area Networks (WMAN), Local Multipoint Distribution Service (LMDS), Worldwide Interoperability for Microwave Access (WiMAX), and/or the like. For illustrative purposes, examples will be provided below relative to WLAN and, more particularly, IEEE 802.11 standards. However, it should be appreciated that the principles described herein are not so limited.

The AP 102 and the wireless stations 104 may each be implemented as a computing system that is programmed or configured to perform the respective functions described herein. The computing system may include multiple distinct computers or computing devices. More particularly, each such computing system typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computing system. Where the computing system includes multiple computing devices, these devices may, but need not, be co-located. The results of the disclosed methods and tasks may be persistently stored by transforming physical storage devices, such as solid state memory chips and/or magnetic disks, into a different state. Further examples of the AP 102 and the wireless stations 104 will be described with respect to FIG. 7.

In a typical embodiment, the AP 102 acts as a master to control the wireless stations 104 and provide access to one or more other networks (e.g., the wide area network mentioned above). The AP 102 can communicate with the wireless stations 104 using, for example, a combination of management frames, control frames, and data frames. Management frames are generally used to manage communications within the wireless network 100 and can include, but are not limited to, beacon frames, association request/response frames, disassociation frames, etc. Control frames (e.g. ACK frame and RTS/CTS frames) are typically used to facilitate exchange of data frames. Data frames can be used, for example, to convey user data between the AP 102 and the wireless stations 104.

In a typical embodiment, the AP 102 transmits a beacon frame at a periodic interval to announce a presence of the wireless network 100. The periodic interval may be referred to herein as a beacon interval. A time when a beacon frame is sent by the AP 102 may be referred to herein as a target beacon transmission time (TBTT). The beacon frame can include, for example, a timestamp, the beacon interval, and a service set identifier (SSID). In general, before data delivery through the AP 102 begins, the wireless stations 104 synchronize with the AP 102 based on the timestamp and associate with the AP 102.

In a normal AP operation mode, the AP 102 typically transmits frames at a normal rate and at a normal power level. The normal rate can be specified, for example, in a mandatory rate set established at the physical layer (e.g., by an attached transceiver), by a BSS basic rate setting, and/or the like. The normal rate and/or the normal power level can be varied by type of frame. For example, in the case of management frames and control frames, the normal power level may be a power level deemed sufficient for a given frame, transmitted at the normal rate, to be successfully received by any wireless station in a coverage area of the AP 102. A data frame typically includes a header part and a data part such that the header part includes information for decoding the data part. In the case of a data frame, the normal power level may be, for example, a power level deemed sufficient for at least a header part of the data frame, transmitted at the normal rate, to be successfully received by any wireless station in the coverage area. In similar fashion, in a normal station-operation mode, each of the wireless stations 104 typically transmit frames at a normal rate and at a normal power level. As with the AP 102, the normal rate of each of the wireless stations 104 can be specified, for example, in a mandatory rate set established at the physical layer (e.g., by an attached transceiver), by a BSS basic rate setting, and/or the like.

Radio frequency (RF) transmission can contribute to a majority of power consumption by the AP 102 and the wireless stations 104. In certain embodiments, the AP 102 allows an AP power-saving mode to be used in place of the normal AP operation mode so that power expended during transmissions to the wireless stations 104 can be reduced. More specifically, the AP 102 can establish one or more criteria that enable categorization of the wireless stations 104 into two or more categories. As described in greater detail with respect to the ensuing figures, the categorization can be carried out by the AP 102, the wireless stations 104, another suitable network element in communication with the AP 102 and/or one or more of the wireless stations 104, and/or a combination thereof. In a typical embodiment, the one or more criteria can be based on a link-quality parameter. In certain embodiments, the wireless stations 104 can similarly allow station power-saving modes so that power expended during transmissions to the AP 102 can also be reduced.

A link-quality parameter may indicate the quality of a communication link. In particular embodiments, a link-quality parameter may be suggestive, at least in part, of an amount of transmit power needed for a transmission to reach one or more intended destinations. For example, in certain embodiments, a link margin could be used as a link-quality parameter. The link margin, often measured in dB, is generally a difference between a given wireless station's sensitivity (i.e., a received power at which the wireless station would stop working) and an actual received power. A link-quality parameter could also be, for example, a received channel power indicator (RCPI), a received signal-to-noise indicator (RSNI), a composite of such metrics, and/or the like.

A link-quality-parameter measurement may refer to information usable to evaluate or assess the quality of a communication link. In some cases, a given link-quality-parameter measurement may directly provide an evaluation or assessment in the form of a value. In other cases, the given link-quality-parameter measurement may include information sufficient to derive an evaluation or assessment, optionally in combination with other information. For example, if the given link-quality parameter were link margin, a link-margin value received from one of the wireless stations 104 could be a link-quality-parameter measurement. In many cases, however, the given link-quality parameter may be, for example, a composite of two or more metrics such as link margin, RCPI, RSNI, distance from the AP 102, etc. In such cases, the link-margin value mentioned above, while still constituting a link-quality-parameter measurement, might be combined with other metrics in order to compute an evaluation or assessment of the given link-quality parameter. An evaluation or assessment of a given link-quality parameter may be referred to as a value of the link-quality parameter.

For ease of description, FIG. 1 depicts the wireless stations 104 as being categorized into either a first category 106(1) or a second category 106(2) (collectively, categories 106). However, it should be appreciated that, in practice, the categories 106 can include two, three, four, or any other number of categories that may be appropriate for a given implementation and/or an environment of the wireless stations 104. The first category 106(1) can include, for example, those of the wireless stations 104 that may adequately communicate with the AP 102 despite relatively low transmit power from the AP 102 (e.g., the wireless stations 104(1), 104(2), 104(3), and 104(4)). The second category 106(2) can include, for example, those of the wireless stations 104 that require higher transmit power from the AP 102 (e.g., the wireless stations 104(5) and 104(6)). Although the second category 106(2) is illustrated as including those of the wireless stations 104 that are geographically furthest from the AP 102, it should be appreciated that this need not be the case. For example, environmental variables or obstructions may cause higher transmit power to be needed even when a distance from the AP 102, by itself, does not justify that result.

In operation, the AP 102 is operable to determine the categories 106 using the one or more criteria described above. Thereafter, the AP 102 can determine an AP power-saving mode based on a quantity and/or makeup of the categories 106. The AP power-saving mode can include, for example, one or more adapted AP-transmission power levels for each of the categories 106. In certain embodiments, each adapted AP-transmission power level represents power savings relative to a corresponding normal power level that would otherwise be used in the normal AP operation mode. In certain other embodiments, at least some of the adapted AP-transmission power levels may be increased relative to the corresponding normal power level if it is determined, for example, that each such increase improves a likelihood of successful data transmission.

The AP power-saving mode can also include a data-transmission schedule that is based, at least in part, on the categories 106. In general, the data-transmission schedule regulates when the wireless stations 104 can transmit and/or receive frames. For example, for each category of the categories 106, the data-transmission schedule may include time periods during which transmission and/or receipt of frames by wireless stations of that category is allowed or disallowed. For example, when transmission is disallowed for a given category, the wireless stations of that category typically refrain from transmitting at least data frames. Exemplary operation of the AP 102 and the wireless stations 104 will be described in more detail with respect to the ensuing Figures.

Figure 2:
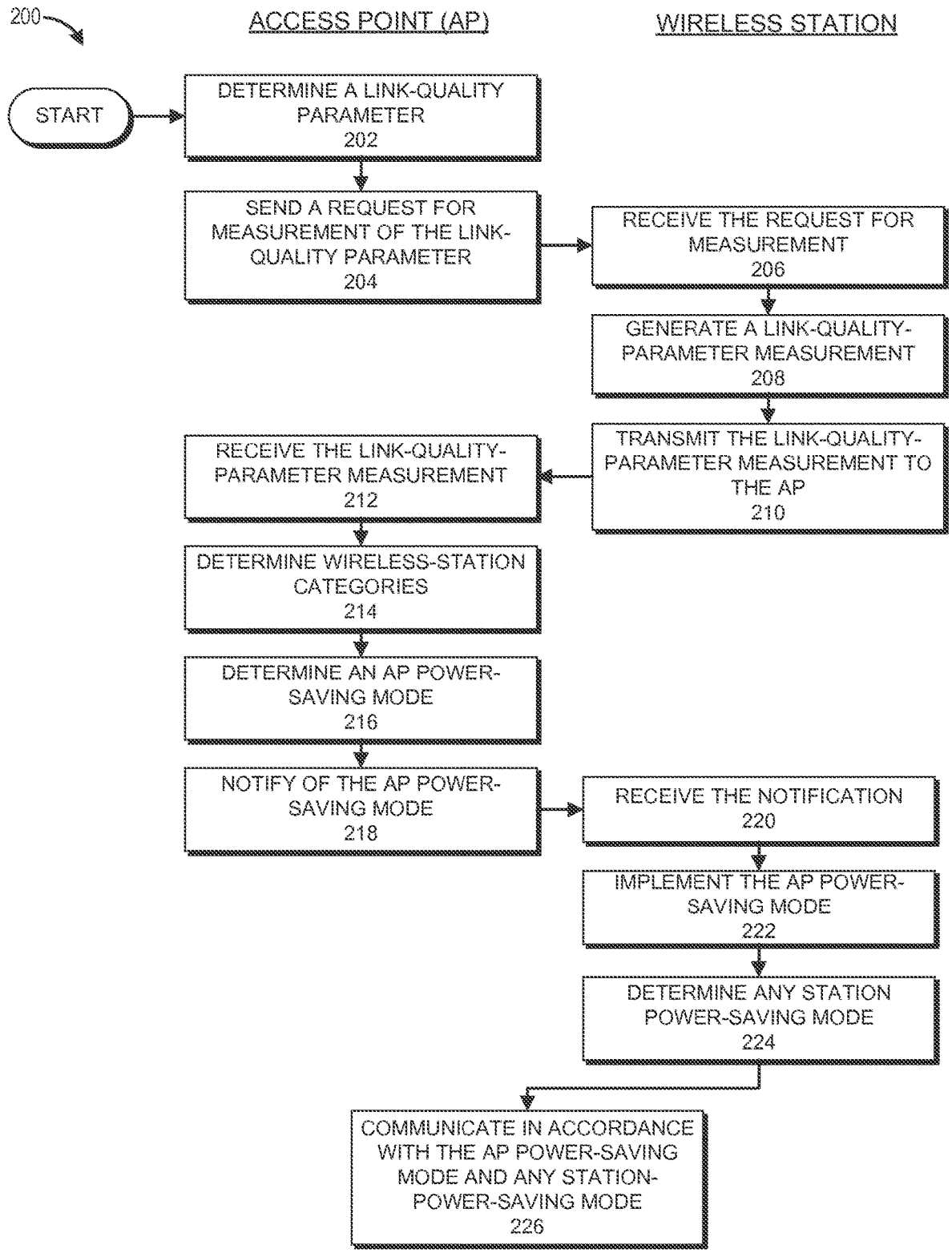
FIG. 2 illustrates an example of a process for initiating an AP power-saving mode.

FIG. 2 illustrates an example of a process 200 for initiating an AP power-saving mode. In a typical embodiment, the process 200 begins with the AP 102 operating in the normal AP operation mode as described with respect to FIG. 1. The process 200 can be triggered, for example, automatically as a result of the AP 102 detecting a need to enter an AP power-saving mode, manually by an administrator, in response to receiving an instruction from a network element coupled to the AP 102, etc. The process 200 can be implemented by any system that can access one or more data sources. For example, the process 200, in whole or in part, can be implemented by one or more of the AP 102 and/or any of the wireless stations 104. The process 200 can also be performed generally by the wireless network 100. Although any number of systems, in whole or in part, can implement the process 200, to simplify discussion, the process 200 will be described in relation to specific components of the wireless network 100.

At block 202, the AP 102 determines a link-quality parameter for use in categorizing the wireless stations 104. The link-quality parameter can be, for example, link margin, RCPI, RSNI, a composition of same, and/or the like as described above with respect to FIG. 1. In various embodiments, the link-quality parameter can be selected from one or more options. For example, in some cases, the link-quality parameter can be selected so as to accommodate a type of information that the wireless stations 104 are operable to provide and/or measure. In other embodiments, the link-quality parameter can be a default link-quality parameter that is used for all categorizations. The link-quality parameter can also be set by an administrator, a network element in communication with the AP 102, etc. In various embodiments, the block 202 can involve determining either one or multiple link-quality parameters. To simplify discussion, examples will be provided below in which the AP 102 determines a single link-quality parameter.

At block 204, the AP 102 sends a request for measurement of the link-quality parameter to the wireless stations 104. For example, if the link-quality parameter were link margin, the request could be a transmission power control (TPC) request according to IEEE 802.11 standards. The request can also be a new measurement request that is an extension, for example, of IEEE 802.11 standards. In some cases, the block 204 can involve the AP 102 broadcasting the request for measurement to all of the wireless stations 104. In other cases, the block 204 can involve the AP 102 individually sending the request for measurement to each of the wireless stations 104 or to each of a subset thereof. At block 206, the wireless stations 104 receive the request for measurement.

At block 208, each of the wireless stations 104 generates a link-quality-parameter measurement. In general, the block 208 includes the wireless stations 104 carrying out the request for measurement to yield the link-quality-parameter measurement. The link-quality-parameter measurement can take the form of a measurement report. For example, if the request for measurement is a TPC request as described above, each of the wireless stations 104 may measure link margin based on an actual received power for the TPC request. The measurement report could be, for example, a TPC report that includes the measured link margin.

At block 210, each of the wireless stations 104 transmits the link-quality-parameter measurement to the AP 102. In some embodiments, each of the wireless stations 104 may additionally save the link-quality parameter measurement in memory for later use. At block 212, the AP 102 receives the link-quality-parameter measurement from each of the wireless stations 104. In various embodiments, the AP 102 may maintain each link-quality-parameter measurement, for example, in a table or list stored in a memory thereof.

At block 214, the AP 102 determines the categories 106 based, at least in part, on the received link-quality-parameter measurements. In general, the categories 106 represent non-overlapping ranges of values of the link-quality parameter. As noted above, in some cases the received link-quality-parameter measurements may be considered values of the link-quality parameter, while in other cases the AP 102 may further process the received link-quality-parameter measurements to obtain the values.

In certain embodiments, the categories 106 can be determined by ascertaining categorization criteria. For example, the categorization criteria can include information sufficient to identify the boundaries of each of the categories 106. In this manner, the categorization criteria can be used to determine, for a given wireless station, to which of the categories 106 it belongs. In some embodiments, the categorization criteria can be pre-established and stored, for example, in memory of the AP 102. In these embodiments, the block 214 can include the AP 102 retrieving the categorization criteria. In other embodiments, the categorization criteria can be generated as part of the block 214 as described below.

For example, in some cases, the AP 102 may pre-establish that the number of categories 106 should be a particular quantity (e.g., two, three, etc.) but not pre-establish the categorization criteria. In these cases, the AP 102 can associate each of the categories 106 with a range of a numeric scale for the link-quality parameter and the categorization criteria can include the boundaries of each such range. The AP 102 can associate each of the categories 106 with a range of the numeric scale in a variety of fashions. For example, the AP 102 may seek to achieve a certain power-saving target, to distribute the wireless stations 104 approximately equally across the categories 106, to distribute the numeric scale approximately equally across the categories 106, etc. If the categories 106 were to include, for example, two categories as illustrated in FIG. 1, the AP 102 could identify a median value among all values of the link-quality parameter. According to this example, the second category 106(2) could be associated with values of the link-quality parameter that are less than the median value while the first category 106(1) could be associated with values of the link-quality parameter that are greater than or equal to the median value. In this manner, the median value could serve as the categorization criteria.

In other cases, the AP 102 may not pre-establish a particular quantity of the categories 106. In these cases, the AP 102 can analyze the values of the link-quality parameter to identify clusters. In these cases, each identified cluster can serve as the basis for a distinct category of the categories 106. For example, the AP 102 can define the categories 106 such that each identified cluster corresponds to different category. In similar fashion to the embodiments described above, the categorization criteria can specify the boundaries of each of the categories 106.

In various embodiments, the category identification can be performed by the AP 102, the wireless stations 104, or both the AP 102 and the wireless stations 104. In embodiments in which the AP 102 performs the category identification (instead of or in addition to the wireless stations 104), the block 214 can included the AP 102 performing the category identification. Results of the category identification such as, for example, a category of each of the wireless stations 104, can be stored in memory of the AP 102 for later use (e.g., in the AP power-saving mode). In embodiments in which the wireless stations 104 perform the category identification (instead of or in addition to the AP 102), the AP 102 can notify the wireless stations 104 of the categorization criteria as part of block 218 (described in greater detail below).

At block 216, the AP 102 determines an AP power-saving mode. The AP power-saving mode typically includes at least one adapted AP-transmission power level for at least one of the categories 106 (i.e., a category-specific AP-transmission power level) and a data-transmission schedule. In some embodiments, the AP power-saving mode can further include an adapted AP-transmission power level for each wireless station of at least a subset of the wireless stations 104 (i.e., a station-specific AP-transmission power level). In these embodiments, the AP 102 can utilize a corresponding category-specific AP-transmission power level when communicating with all stations of a particular category of the categories 106 and can utilize a corresponding station-specific AP-transmission power level when communicating with a particular wireless station of the wireless stations 104. In certain embodiments, the data-transmission schedule can be derived from one or more predefined operation modes. An example of determining the AP power-saving mode will be described with respect to FIG. 3.

Table 1 below illustrates examples of predefined operation modes of the AP 102 that can be used as the basis for the data-transmission schedule described above. For illustrative purposes, Table 1 assumes that the categories 106 include two categories as depicted in FIG. 1. Although any number of time periods may be used, Table 1 lists, for each predefined operation mode, two time periods: a first time period (T1) and a second time period (T2). During each time period, transmission and/or reception of data frames is disallowed for at least one of the categories 106. When transmission is disallowed for a given category, the wireless stations of that category typically refrain from transmitting at least data frames.

TABLE 1

| Operation mode | First time period (T1) | | Second time period (T2) | |
| --- | --- | --- | --- | --- |
| | Category 1 | Category 2 | Category 1 | Category 2 |
| 1 | Transmission and Reception | No transmission; At least no reception of data | No transmission; No reception of data frames | Transmission and Reception |

TABLE 1-continued

| Operation mode | First time period (T1) Category 1 | First time period (T1) Category 2 | Second time period (T2) Category 1 | Second time period (T2) Category 2 |
|---|---|---|---|---|
| | | frames (limitations on reception of other types of frames may also be imposed). | | |
| 2 | Transmission and Reception | No transmission; At least no reception of data frames (limitations on reception of other types of frames may also be imposed). | Transmission and Reception | Transmission and Reception |
| 3 | Transmission and Reception | No transmission; At least no reception of data frames (limitations on reception of other types of frames may also be imposed). | Reception only | Transmission and Reception |
| 4 | Transmission and Reception | Reception only | Reception only | Transmission and Reception |
| 5 | Transmission and Reception | Reception only | Transmission and Reception | Transmission and Reception |
| 6 | Transmission and Reception | Reception only | No transmission; No reception of data frames. | Transmission and Reception |
| 7 | Transmission and Reception | Reception only | No transmission; No reception of data frames | Transmission only |

At block 218, the AP 102 notifies the wireless stations 104 of the AP power-saving mode. In various embodiments, the notification can be a single message or multiple messages. As noted above, in various embodiments, the category identification can be performed by the AP 102, the wireless stations 104, or both the AP 102 and the wireless stations 104. In various embodiments, a format of the notification can vary based on whether the wireless stations 104 perform the category identification.

In the case of only the AP 102 performing the category identification, the notification at the block 218 can include the AP 102 notifying each of the wireless stations 104 of the appropriate category. In the case of the wireless stations 104 performing the category identification (instead of or in addition to the AP 102), the initiation at the block 218 can include the AP 102 notifying each of the wireless stations 104 of the categorization criteria so that the wireless stations 104 can identify the appropriate category (e.g., at block 222 described below). Table 2 below provides an exemplary format for the notification when only the AP 102 performs the category identification. Table 3 below provides an exemplary format for the notification when the wireless stations 104 perform the category identification (instead of or in addition to the AP 102). For illustrative purposes, Table 2 and Table 3 utilize IEEE 802.11 standards.

TABLE 2

| Field | Description/Examples |
|---|---|
| Element ID (Part 1) | The notification of AP power-saving mode may use a unique Element ID, for example, out of those reserved in IEEE 802.11 standards. |
| Length (Part 2) | Describes a number of octets in the information field (i.e. a length of Part 3). |
| Categorization ID (Part 3) | Each category can be assigned a unique category ID code. For example, if a recipient wireless station belongs to category 1, the category ID could be set to a category ID code corresponding to category 1. |

TABLE 3

| Field | Description/Examples |
|---|---|
| Element ID (Part 1) | The notification of AP power-saving mode may use a unique Element ID, for example, out of those reserved in IEEE 802.11 standards. |
| Length (Part 2) | Describes a number of octets in the information field (i.e. a length from Part 3 to Part 8). |
| Categorization Criteria (Part 3) | For example, if the AP determines categories based on a median value, the categorization criteria can be set to the median value or a value equivalent to the median value. |
| Operation Mode (Part 4) | Each operation mode can be assigned a unique mode code. For example, if the AP determines to switch to operation mode 1, this field could be set to the mode code corresponding to operation mode 1. |

TABLE 3-continued

| Field | Description/Examples |
| --- | --- |
| Start Time (Part 5) | For example, if it is assumed that the current TBTT, as of when the notification is sent, is TBTT (N), and that operation mode 1 will start from TBTT (N + 1), this field could be set to 1. |
| Duration of T1 (Part 6) | For example, if a first time period (T1) is configured to last two beacon intervals, this field could be set to 2. |
| Duration of T2 (Part 7) | For example, if a second time period (T2) is configured to last one beacon interval, this field could be set to 1 |
| Number of Counts (Part 8) | For example, if the operation mode 1 is configured to repeat three times, this field could be set to three. |

Advantageously, in certain embodiments, radio resources can be saved when the AP 102 allows the wireless stations 104 to perform the category identification. In these embodiments, the notification at the block 218 can include the AP 102 broadcasting a single message containing the categorization criteria. By comparison, in certain other embodiments in which only the AP 102 performs the category identification, multiple, longer messages may be sent (e.g., an individual message to each of the wireless stations 104 that identifies the appropriate category). In many cases, broadcasting a single message as described above can save significant radio resources.

At block 220, the wireless stations 104 receive the notification from the AP 102. At block 222, the wireless stations 104 implement the AP power-saving mode. In general, the block 222 encompasses the wireless stations 104 establishing any necessary configurations, for example, to abide by the data-transmission schedule and follow the AP power-saving mode. In addition, as described above, in certain embodiments each of the wireless stations 104 may be responsible for identifying the appropriate category of the categories 106. In these embodiments, the implementation of the AP power-saving mode can include identifying the appropriate category based on the categorization criteria. The wireless stations 104 can store a result of the category identification such as, for example, an identifier for the appropriate category, in memory thereof for later use (e.g., in the AP power-saving mode). The wireless stations 104 may send a confirmation message to the AP 102 after the appropriate category has been identified. In some embodiments, the AP 102 may treat any of the wireless stations 104 for which no confirmation message is received as not supporting the AP power-saving mode. In these embodiments, such wireless stations may be disassociated from the AP 102, forced to enter an idle mode, and/or the like. In various embodiments, this functionality can be beneficial for backwards compatibility.

At block 224, the wireless stations 104 can each determine any station power-saving mode that may be utilized in conjunction with the AP power-saving mode. For example, each of the wireless stations 104 may derive an adapted station-transmission power level for use when transmitting data frames to the AP 102. Each adapted station-transmission power level usually represents power savings relative to a corresponding normal power level that would otherwise be used in the normal station-operation mode of the wireless stations 104. Each adapted station-transmission power level can be particularized according to the appropriate category of the categories 106, a corresponding link-quality parameter measurement, etc. In certain embodiments, the block 224 may be omitted so that no station-power saving modes are determined. In these embodiments, it may be deemed sufficient for the wireless stations 104 to follow the AP power-saving mode and otherwise operate normally using, for example, normal power levels.

At block 226, the AP 102 and the wireless stations 104 communicate in accordance with the AP power-saving mode and any applicable station power-saving mode. An example of the communication will be described with respect to FIG. 4. The block 226 can include, for example, the AP 102 and the wireless stations 104 switching back to the normal AP operation mode according to the data-transmission schedule.

Figure 3:
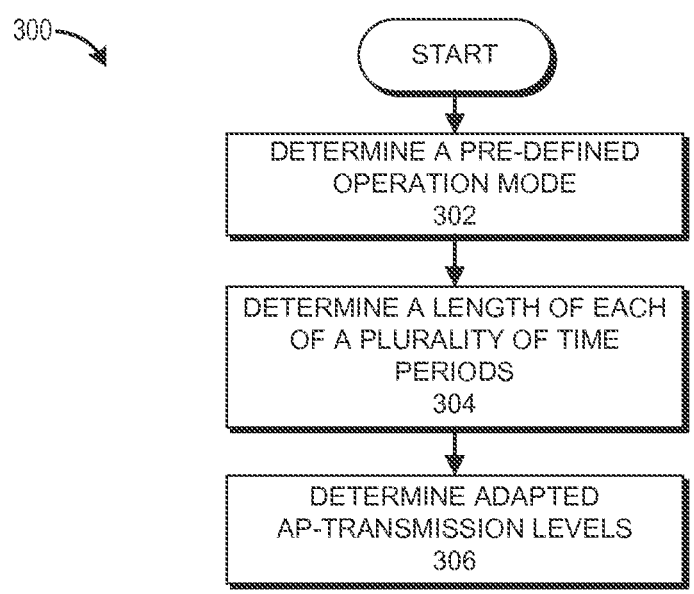
FIG. 3 illustrates an example of a process for determining an AP power-saving mode.

FIG. 3 illustrates an example of a process 300 for determining an AP power-saving mode using one or more predefined operation modes. In some embodiments, the process 300 can be performed as all or part of the block 216 of FIG. 2. The process 300 can be implemented by any system that can access one or more data sources. For example, the process 300, in whole or in part, can be implemented by one or more of the AP 102 and/or any of the wireless stations 104. The process 300 can also be performed generally by the wireless network 100. Although any number of systems, in whole or in part, can implement the process 300, to simplify discussion, the process 300 will be described in relation to specific components of the wireless network 100.

At block 302, the AP 102 determines a predefined operation mode. The predefined operation mode can be, for example, one of the predefined operation modes listed in Table 1 above. In various embodiments, the predefined operation mode can be selected based on criteria such as, for example, a number of the categories 106, the link-quality-parameter measurements, values of the link-quality parameter, an urgency of implementing power savings on the AP 102, a traffic status on the wireless network 100, a distribution of the wireless stations 104 among the categories 106, etc. In other embodiments, the determined predefined operation mode can be a default operation mode.

At block 304, the AP 102 determines a length of each of a plurality of time periods. For example, the AP 102 can use one or more criteria to calculate the length of each of the plurality of time periods. For example, the AP 102 could allocate a longer time period to the first category 106(1) if power savings is deemed critical for the AP. The AP 102 could also allocate a longer time period to whichever category of the categories 106 has a largest proportion of the wireless stations 104. By way of further example, the AP 102 could allocate a longer time period to whichever category of the categories 106 has more active traffic.

In a typical embodiment, the AP 102 can set the length of each of the plurality of time periods in terms of a number of time units, a number of beacon intervals, or in any other suitable manner. For example, in the case of beacon intervals, the first time period (T1) could start at TBTT(N+1) and last for two beacon intervals and the second time period (T2) could start from TBTT(N+3) and last for one beacon interval. This pattern of time period allocation could repeat a desired number of times (e.g., until the number of counts shown in Table 3 is reached). It should be understood that the pattern of time period allocation may be alternatively configured in any number of fashions. By way of further example, in the case of time units, the first time period (T1) could start at the end of a beacon transmission corresponding to TBTT(N+1) and last for X time units. Continuing this example, the second time period (T2) could start at the end of the first time period (T1) and last for a duration defined by a difference between the length of a beacon interval and X.

At block 306, the AP 102 determines adapted AP-transmission power levels. As described above with respect to the block 214 of FIG. 2, in certain embodiments the categorization criteria for the categories 106 can be pre-established and stored, for example, in memory of the AP 102. In some cases, the adapted AP-transmission power levels can also be pre-established and stored in memory of the AP 102. In these embodiments, the block 306 can include retrieving the pre-established adapted AP-transmission power levels. In other embodiments, the AP 102 can determine the adapted AP-transmission power levels through computation as described below.

For example, as described with respect to FIG. 2, the AP 102 can compute a category-specific AP-transmission level for each of the categories 106, a station-specific AP-transmission level for all or a portion of the wireless stations 104, etc. The AP 102 may determine a given adapted AP-transmission power level in different ways. Equation 1 below illustrates an example of one such way.

$$A_p = N_p - L_m + B \qquad \text{Equation 1}$$

According to Equation 1, an adapted AP-transmission power level ($A_p$) can be computed as a function of a normal AP-transmission power level ($N_p$), a link margin ($L_m$), and a buffer value (B). The normal AP-transmission power level ($N_p$) generally corresponds to whatever normal power level would be utilized in the situation at hand according to the normal AP operation mode. The link margin ($L_m$) is typically a limiting factor with respect to a purpose of the adapted AP-transmission power level ($A_p$). In other words, the link margin ($L_m$) can be indicative of an amount by which the normal AP-transmission power level ($N_p$) can potentially be reduced. The buffer value (B) is generally a configurable value, greater than or equal to zero, that can be used in some cases to provide additional margin for error. In many cases, the buffer value (B) may be omitted.

An example of Equation 1 will now be described. As described above, the first category 106(1) can include those of the wireless stations 104 that require lower transmit power from the AP 102 while the second category 106(2) can include those of the wireless stations 104 that require higher transmit power from the AP 102. As one example of the computation, assume that a categorization criterion for the categories 106 is a median link-margin value across the wireless stations 104 such that the AP 102 has categorized those of the wireless stations 104 having a link margin above the median link-margin value into the first category 106(1). In this case, when the AP 102 computes a category-specific AP-transmission power level for transmissions to the wireless stations of the first category 106(1), the link margin ($L_m$) can be set to the median link-margin value and the normal AP-transmission power level ($N_p$) can be set to whatever normal power level would otherwise be used in the normal AP operation mode. Continuing this example, when the AP 102 computes a category-specific AP-transmission power level for transmissions to the wireless stations 104 of the second category 106(2), the link margin ($L_m$) can be set to the smallest link-margin value among those reported by the wireless stations 104 and the normal AP-transmission power level ($N_p$) can be set to whatever normal power level would otherwise be used in the normal AP operation mode. Alternatively, the AP 102 can determine to use the normal AP-transmission power level ($N_p$) for transmissions to the wireless stations of the second category 106(2).

$$S_p = N_{sp} - L_m + B \qquad \text{Equation 2}$$

Equation 2 above illustrates a similar calculation that can be used by each the wireless stations 104 to calculate an adapted station-transmission power level as described with respect to the block 224 of FIG. 2. For example, when one of the wireless stations 104 computes its adapted station-transmission power level ($S_p$), a link margin ($L_m$) can be set to its measured link-margin value (e.g., as generated at the block 208 of FIG. 2) and a normal station-transmission power level ($N_{sp}$) can be set to whatever normal power level would otherwise be used in the normal station-operation mode.

Figure 4:
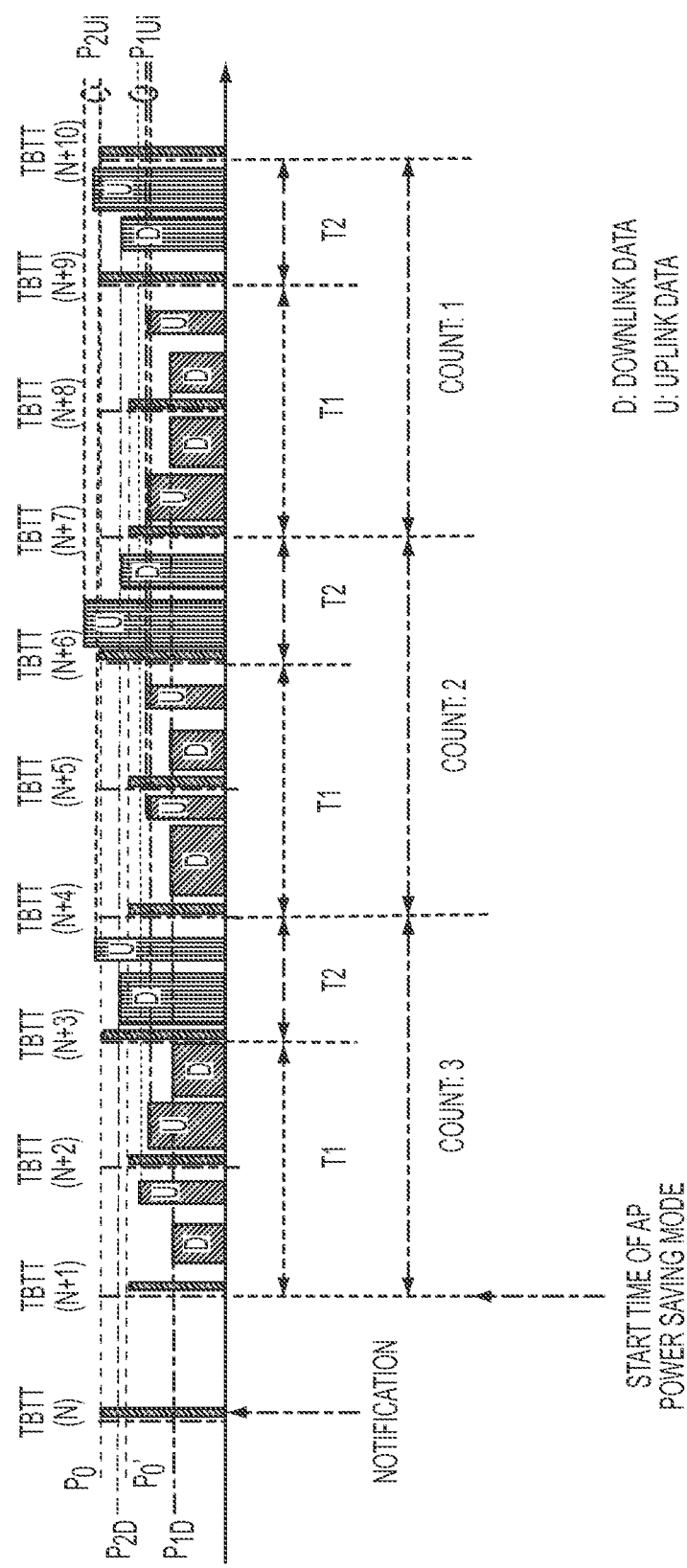
FIG. 4 illustrates exemplary operation of an AP power-saving mode.

FIG. 4 illustrates exemplary operation of an AP power-saving mode. For illustrative purposes, FIG. 4 will be described with respect to the wireless network 100 of FIG. 1. In particular, FIG. 4 depicts operation mode 1 as shown in Table 1 above. Accordingly, during the first time period (T1), those of the wireless stations 104 that are in the first category 106(1) are allowed to transmit and receive frames. Transmission and receipt of frames by those of the wireless stations 104 that are in the second category 106(2) are disallowed during the first time period (T1). Therefore, as illustrated, those of the wireless stations 104 that are in the second category 106(2) refrain from transmitting at least data frames during the first time period (T1). During the second time period (T2), those of the wireless stations 104 that are in the second category 106(2) are allowed to transmit and receive frames. Transmission and receipt of frames by those of the wireless stations 104 that are in the first category 106(1) are disallowed during the second time period (T2). Therefore, as illustrated, those of the wireless stations 104 that are in the first category 106(1) refrain from transmitting at least data frames during the second time period (T2).

A variety of exemplary transmission power levels are shown in FIG. 4. Specifically, P0, P0', P1D, and P2D are shown to be adapted AP-transmission power levels. In the illustrated embodiment, P0 is a power level deemed sufficient for a given frame to be successfully received by any wireless station in a coverage area of the AP 102. P0 may be, for example, a normal power level as would be used in the normal operation mode of the AP 102. P0' may be considered a category-specific AP-transmission level for the first category 106(1). More particularly, P0' can be a power level deemed sufficient for a given management frame (e.g., beacon frame) to be successfully received by any wireless station of the first category 106(1).

P1D and P2D are illustrative of category-specific AP-transmission levels for the first category 106(1) and the second category 106(2), respectively. In particular, P1D and P2D can be power levels deemed sufficient for a given data frame to be successfully received by any wireless station of the first category 106(1) and the second category 106(2), respectively. For example, P1D and P2D can be power levels deemed sufficient for at least a header part of data frames to be received by wireless stations of the respective category for purposes of decoding a data part of the data frames.

P1Ui and P2Ui are each arrays of adapted station-transmission power levels. P1Ui and P2Ui correspond to the first category 106(1) and the second category 106(2), respectively. Each wireless station of the first category 106(1) has a corresponding adapted station-transmission power level in P1Ui. In like fashion, each wireless station of the second category 106(2) has a corresponding adapted station-transmission power level in P2Ui. In some cases, all station-transmission power levels in the P1Ui and P2Ui may be equal such that there is, in effect, a single station-transmission power level for the first category 106(1) and a single station-transmission power level for the second category 106(2). In other cases, each adapted station-transmission power level can be station-specific in the manner described with respect to the block 224 above.

A data-transmission schedule of FIG. 4 is summarized by Table 4 below. Based on Table 4, the AP power-saving mode begins at TBTT(N+1), a first time period (T1) should last two beacon intervals, and a second time period (T2) should last one beacon interval. The duration of the first time period (T1) and the duration of the second time period (T2) can form a data-transmission pattern, which pattern is repeated three times according to a specified number of counts. Exemplary operation during the first time period (T1) according to the embodiment illustrated by FIG. 4 will now be described.

TABLE 4

| Start Time | Next TBTT |
|---|---|
| Duration of T1 | 2 |
| Duration of T2 | 1 |
| Number of Counts | 3 |

In general, during the first time period (T1), the AP 102 can transmit any management frames (e.g., beacon frames) and control frames at the power level $P_0'$. In some embodiments, the AP 102 may alternatively transmit management and control frames at the power level $P_0$ so that all wireless stations that may be in the coverage area of the AP 102 can successfully receive such frames. The AP 102 transmits any downlink data frames (D) to the wireless stations of the first category 106(1) at the power level $P_{1D}$. In similar fashion, during the first time period (T1), the wireless stations of the first category 106(1) can transmit uplink data frames (U) to the AP 102 at the reduced power levels represented by $P_{1Ui}$. In some embodiments, any frames intended for the wireless stations of the second category 106(2) may be buffered during the first time period (T1). In other embodiments, such frames may be discarded. In these embodiments, additional power savings can be achieved by eliminating any need to service the wireless stations of the second category 106(2) during the first time period (T1).

During the first time period (T1), the AP 102 can realize power savings each time a management or control frame is transmitted at the power level $P_0'$ and each time a downlink data frame (D) is sent at the power level $P_{1d}$. In a typical embodiment, the power level $P_0'$ and the power level $P_{1D}$ represent reductions relative to corresponding normal power levels of the normal AP operation mode. However, in a typical embodiment, a risk of collisions during the first time period (T1) is not increased. Rather, as the power level $P_0'$ and the power level $P_{1D}$ are defined above, all frames transmitted by the AP 102 during the first time period (T1) will generally be successfully received by the wireless stations of the first category 106(1). Because, for purposes of this example, the wireless stations of the second category 106(2) are not permitted to transmit frames during the first time period (T1), the fact that some or all of the wireless stations of the second category 106(2) may not detect such frames does not generally impact a risk of collisions. Even if collision problems do arise, the collision problems can be resolved using, for example, control frames (e.g., RTS, CTS, ACK, etc.).

In various embodiments, the wireless stations of the first category 106(1) can realize power savings during the time period (T1), for example, each time an uplink data frame (U) is transmitted using the power levels $P_{1Ui}$. Since the wireless stations of the second category 106(2) are not permitted to transmit frames during the first time period (T1), the wireless stations of the second category 106(2) can realize power savings, for example, by being in a power-saving or sleep mode according to IEEE 802.11 standards for all or part of the first time period (T1). In addition, although the wireless stations of the first category 106(1) utilize the power levels Pith, a risk of collisions is not generally increased as result because the wireless stations of the second category 106(2) are not permitted to transmit frames during the first time period (T1). Rather, as the power levels $P_{1Ui}$ are defined above, all frames transmitted by the wireless stations of the first category 106(1) during the first time period (T1) will generally be successfully received by the AP 102. As noted above, any collision problems that do arise can be resolved using control frames.

Exemplary operation during the second time period (T2) according to the embodiment illustrated by FIG. 4 will now be described. In general, during the second time period (T2), the AP 102 can transmit management frames (e.g., beacon frames) and control frames at the power level $P_0$. The AP 102 transmits, at the power level $P_{2D}$, downlink data frames (D) to the wireless stations of the second category 106(2). In similar fashion, during the second time period (T2), the wireless stations of the second category 106(2) can transmit uplink data frames (U) to the AP 102 at the power levels represented by $P_{2Ui}$. In some embodiments, any frames intended for the wireless stations of the first category 106(1) may be buffered during the second time period (T2). In other embodiments, such frames may be discarded. In these embodiments, additional power savings can be achieved by eliminating any need to service the wireless stations of the first category 106(1) during the second time period (T2).

As noted above, the power levels represented by $P_{2Di}$ may, but need not be, less than corresponding normal power levels that would otherwise be used in the normal station-operation mode of the wireless stations of the second category 106(2). To the extent that the power levels represented by $P_{2Di}$ represent reductions, the wireless stations of the second category 106(2) can realize power savings during the second time period (T2). In addition, since the wireless stations of the first category 106(1) are not permitted to transmit frames during the second time period (T2), the wireless stations of the first category 106(1) can realize power savings, for example, by being in a power-saving or sleep mode according to IEEE 802.11 standards for all or part of the second time period (T2). In addition, although the wireless stations of the second category 106(2) utilize the power levels $P_{2Ui}$, a risk of collisions is not generally increased as result because the wireless stations of the first category 106(1) are not permitted to transmit frames during the second time period (T2). Rather, as the power levels $P_{2Ui}$ are defined above, all frames transmitted by the wireless stations of the second category 106(2) during the second time period (T2) will generally be successfully received by the AP 102. As noted above, any collision problems that do arise can be resolved using control frames.

More particularly addressing the embodiment of FIG. 4, at TBTT(N), the AP 102 sends, at the power level $P_0$, a notification of the AP power-saving mode. In a typical embodiment, utilization of the power level $P_0$ can help ensure that all of the wireless stations 104 successfully receive the notification. The notification may include, for example, any of the information described with respect to the block 218 of FIG. 2. For purposes of this example, the notification is assumed to indicate, inter alia, that the AP power-saving mode will begin at TBTT(N+1). The notification may be sent as part of, or in conjunction with, a beacon frame at the time TBTT(N).

A first iteration of the first time period (T1) begins at TBTT(N+1) and continues until TBTT(N+3). At TBTT(N+1), the AP 102 transmits a first beacon frame at the power level P0'. At time TBTT(N+2), the AP 102 transmits a second beacon frame at the power level P0' in similar fashion to the first beacon frame. Throughout the first iteration of the first time period (T1), the AP 102 transmits management and control frames at the power level P0' and downlink data frames (D) at the power level P1D. Meanwhile, the wireless stations of the first category 106(1) transmit uplink data frames (U) according to the power levels P1Ui.

A first iteration of the second time period (T2) begins at TBTT(N+3) and continues until TBTT(N+4). At TBTT(N+3), the AP 102 transmits a third beacon frame at the power level P0. Throughout the first iteration of the second time period (T2), the AP 102 transmits management and control frames at the power level P0 and downlink data frames (D) at the power level P2D. Meanwhile, the wireless stations of the second category 106(2) transmit uplink data frames (U) according to the power levels P2Ui.

As illustrated in FIG. 4, the wireless network 100 iterates through the above-described pattern of time-period allocation between the first time period (T1) and the second time period (T2) three times (i.e., in accordance with the number of counts shown in Table 4). At TBTT (N+10), the AP power-saving mode ends. At this point, the AP 102 and the wireless stations 104 may revert back to their respective normal operation modes described above.

In various embodiments, the embodiment of FIG. 4 can provide numerous other advantages. For example, in various embodiments, each instance of a reduced power level described above can serve to reduce interference with neighboring wireless networks. To the extent all such wireless networks utilize power-saving modes such as those described above, overall interference among numerous wireless networks can be reduced. Interference can be further reduced because data-transmission schedules such as those described above can reduce a total number of wireless stations that are able to transmit frames at a given time.

It should be appreciated that the embodiment of FIG. 4 is only intended as an illustrative example of how the AP 102 and the wireless stations 104 can operate in an AP power-saving mode. Numerous variations are contemplated and will be apparent to one of ordinary skill in the art after reviewing the inventive principles contained herein. For example, the pattern of time period allocation described above could be changed so that the first time period (T1) and the second time period (T2) are equal and, together, take up a beacon interval.

In addition, although the embodiment of FIG. 4 depicts the predefined operation mode 1 as shown in Table 1 above, other operation modes can also be used such as, for example, any of the other predefined operation modes shown in Table 1. The AP 102 and the wireless stations 104 can take similar actions depending on a number of time periods, a length of each time periods, which categories of wireless stations can receive or transmit frames in a given time period, which adapted power levels are utilized, etc. For instance, whenever wireless stations of a given category are permitted to receive data frames, each transmission by the AP 102 to those wireless stations can be at an adapted AP-transmission power level that is, for example, station-specific or category-specific. Whenever wireless stations of a given category are permitted to transmit data frames, such transmissions can be at an adapted station-transmission power level. In similar fashion, the AP 102 can transmit, for example, management frames and control frames at a power level that is adapted to a desired scope (e.g., all of the wireless stations 104, one or more particular categories of the categories 106, etc.)

Figure 5:
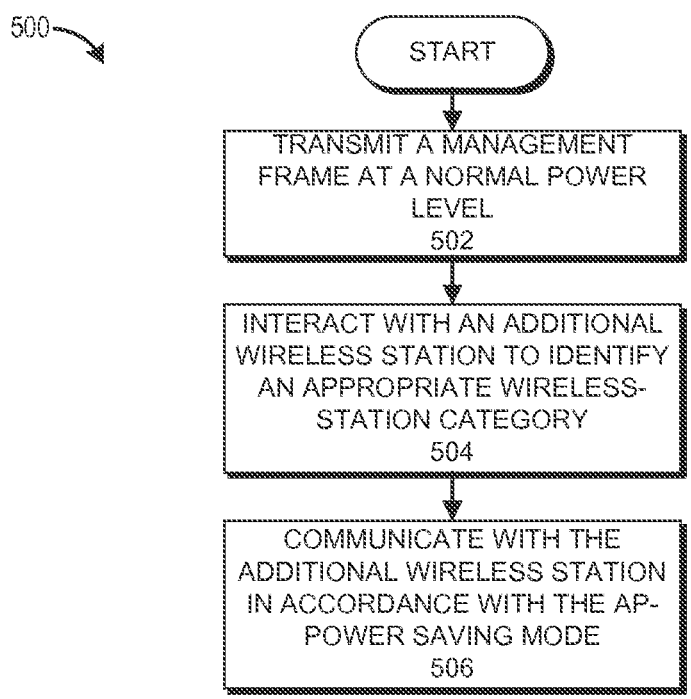
FIG. 5 illustrates an example of a process for onboarding additional wireless stations to a wireless network.

FIG. 5 illustrates an example of a process 500 for onboarding additional wireless stations to a wireless network. In various embodiments, the process 500 can be performed subsequent to the process 200 of FIG. 2. The process 500 can also be performed independently of the process 200 of FIG. 2. The process 500 can be implemented by any system that can access one or more data sources. For example, the process 500, in whole or in part, can be implemented by one or more of the AP 102 and/or any of the wireless stations 104. The process 500 can also be performed generally by the wireless network 100. Although any number of systems, in whole or in part, can implement the process 500, to simplify discussion, the process 500 will be described in relation to specific components of the wireless network 100.

At block 502, the AP 102 transmits a management frame at a normal power level. In a typical embodiment, the AP 102 is operating in an AP power-saving mode such as, for example, the AP power-saving mode described with respect to FIG. 3. In some embodiments, the management frame may instead be transmitted at an adapted AP-transmission power level. The management frame typically includes a notification of the AP power-saving mode. The management frame can be, for example, a beacon frame. Table 5 and Table 6 illustrate exemplary formats for the management frame.

TABLE 5

| Field | Description/Examples |
|---|---|
| Element ID (Part 1) | The notification of AP power-saving mode may use a unique Element ID, for example, out of those reserved in IEEE 802.11 standards. |
| Length (Part 2) | Describes a number of octets in the information field (i.e. a length from Part 3 to Part 7). |
| Operation Mode (Part 3) | Each operation mode can be assigned a unique mode code. For example, if the AP is operating in operation mode 1, this field could be set to the mode code corresponding to operation mode 1. |
| Duration of T1 (Part 4) | For example, if a first time period (T1) is configured to last two beacon intervals, this field could be set to 2. |

TABLE 5-continued

| Field | Description/Examples |
|---|---|
| Duration of T2 (Part 5) | For example, if a second time period (T2) is configured to last one beacon interval, this field could be set to 1 |
| Current Time Period (Part 6) | Each time period can be assigned a unique period code. For example, if the AP is currently operating in the first time period (T1), this field could be set to 1. |
| Duration Remaining for Current Time Period (Part 7) | For example, if the AP has finished one beacon interval of the first time period (T1) and the first time period (T1) has a duration of two beacon intervals, this field could be set to 1. |

TABLE 6

| Field | Description/Examples |
|---|---|
| Element ID (Part 1) | The notification of AP power-saving mode may use a unique Element ID, for example, out of those reserved in IEEE 802.11 standards. |
| Length (Part 2) | Describes a number of octets in the information field (i.e. a length from Part 3 to Part 9). |
| Operation Mode (Part 3) | Each operation mode can be assigned a unique mode code. For example, if the AP is currently operating in operation mode 1, this field could be set to the mode code corresponding to operation mode 1. |
| Duration of T1 (Part 4) | For example, if a first time period (T1) is configured to last two beacon intervals, this field could be set to 2. |
| Duration of T2 (Part 5) | For example, if a second time period (T2) is configured to last one beacon interval, this field could be set to 1 |
| Current Time Period (Part 6) | Each time period can be assigned a unique period code. For example, if the AP is currently operating in the first time period (T1), this field could be set to 1. |
| Duration Remaining for Current Time Period (Part 7) | For example, if the AP has finished one beacon interval of the first time period (T1) and the first time period (T1) has a duration of two beacon intervals, this field could be set to 1. |
| Measurement Request (Part 8) | Each link-quality parameter can be assigned a unique parameter code. For example, if the AP is configured to use link margin as the link-quality parameter, this field can be set to a link-quality-parameter code corresponding to link margin. By way of further example, part 8 may include a measurement request such as, for example, a TPC request as defined in IEEE 802.11 standards, a new measurement request defined as an extension to IEEE 802.11 standards, etc. |
| Categorization Criteria (Part 9) | For example, if the AP determines categories based on a median value, the categorization criteria can be set to the median value or a value equivalent to the median value. |

At block 504, the AP 102 interacts with an additional wireless station to identify an appropriate wireless category of the categories 106. Examples of the interaction will be described with respect to FIGS. 6A-6D. At block 506, the AP 102 communicates with the wireless station, in accordance with the AP power-saving mode, as one of the wireless stations 104.

Figure 6A:
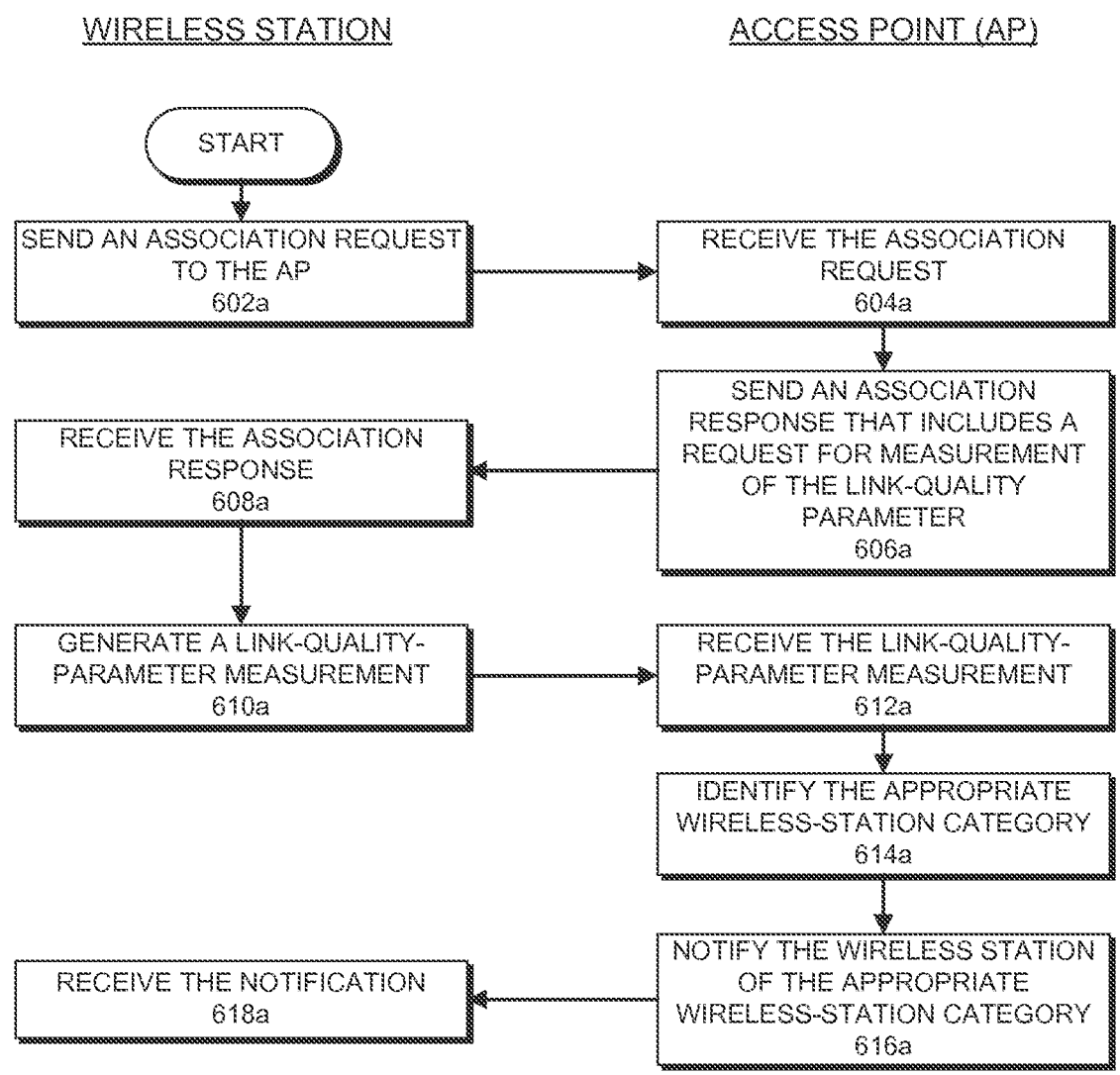
FIG. 6A illustrates an example of a process for interacting with an additional wireless station.

FIG. 6A illustrates an example of a process 600a for interacting with an additional wireless station for purposes of onboarding the additional wireless station to a wireless network. In various embodiments, the process 600a can be performed as all or part of the block 504 of FIG. 5. The process 600a can be implemented by any system that can access one or more data sources. For example, the process 600a, in whole or in part, can be implemented by one or more of the AP 102 and/or any of the wireless stations 104. The process 600a can also be performed generally by the wireless network 100. Although any number of systems, in whole or in part, can implement the process 600a, to simplify discussion, the process 600a will be described in relation to specific components of the wireless network 100.

At block 602a, the additional wireless station sends an association request to the AP 102 for purposes of joining the wireless network 100. The association request is typically responsive to a management frame such as, for example, the management frame transmitted at the block 502 of FIG. 5. For purposes of the process 600a, the management frame that is transmitted at the block 502 of FIG. 5 is typically of the form shown in Table 5. The association request can be, for example, according to a format as defined in IEEE 802.11 standards. The association request typically includes a capabilities indication that is indicative of the additional wireless station's ability to operate in the AP power-saving mode. In some embodiments, the AP 102 may reject the association request if the additional wireless station fails to indicate that it is capable of operating in the AP power-saving mode.

At block 604a, the AP 102 receives the association request. At block 606a, the AP 102 sends to the additional wireless station an association response (e.g., according to a format as defined in IEEE 802.11 standards). The association response includes a request for measurement of a link-quality parameter that serves as a basis for categorization in the AP power-saving mode. In various embodiments, the association response can be either a single message or multiple messages. At block 608a, the additional wireless station receives the association response. At block 610a, the additional wireless station generates a link-quality-parameter measurement. In general, the block 610a can include performing any of the functionality described above with respect to the block 208 of FIG. 2.

At block 612a, the AP 102 receives the link-quality-parameter measurement. At block 614a, the AP 102 identifies an appropriate category of the categories 106 for the additional wireless station. The identification can be based, at least in part, on the received link-quality-parameter measurement and categorization criteria maintained by the AP 102. In general, the identification of the appropriate category can be performed as described above with respect to FIGS. 1-2. At block 616*a*, the AP 102 notifies the additional wireless station of the appropriate category. At block 618*a*, the additional wireless station receives the notification. At this point, the additional wireless station can be associated with the AP 102 and made a part of the wireless stations 104.

Figure 6B:
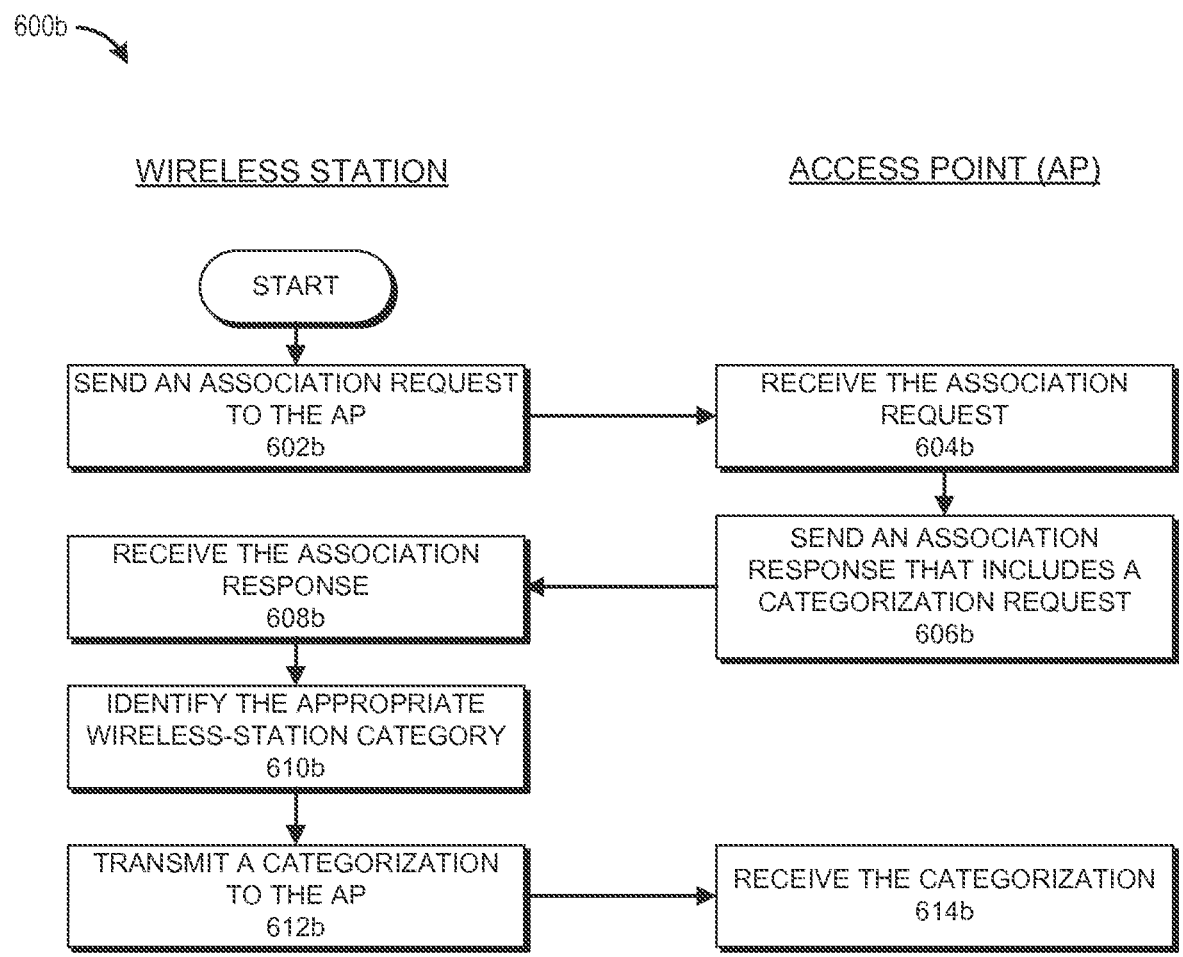
FIG. 6B illustrates an example of a process for interacting with an additional wireless station.

FIG. 6B illustrates an example of a process 600*b* for interacting with an additional wireless station for purposes of onboarding the additional wireless station to a wireless network. In various embodiments, the process 600*b* can be performed as all or part of the block 504 of FIG. 5. The process 600*b* can be implemented by any system that can access one or more data sources. For example, the process 600*b*, in whole or in part, can be implemented by one or more of the AP 102 and/or any of the wireless stations 104. The process 600*b* can also be performed generally by the wireless network 100. Although any number of systems, in whole or in part, can implement the process 600*b*, to simplify discussion, the process 600*b* will be described in relation to specific components of the wireless network 100.

At block 602*b*, the additional wireless station sends an association request to the AP 102 for purposes of joining the wireless network 100. The association request is typically responsive to a management frame such as, for example, the management frame transmitted at the block 502 of FIG. 5. For purposes of the process 600*b*, the management frame that is transmitted at the block 502 of FIG. 5 is typically of the form shown in Table 5. The association request can be, for example, according to a format as defined in IEEE 802.11 standards. The block 602*b* can generally include any of the functionality described above with respect to the block 602*a* of FIG. 6A.

At block 604*b*, the AP 102 receives the association request. At block 606*b*, the AP 102 sends to the additional wireless station an association response (e.g., according to a format as defined in IEEE 802.11 standards). The association response includes a categorization request. In a typical embodiment, the categorization request indicates to the additional wireless station that it, rather than the AP 102, will need to identify an appropriate category of the categories 106. In that way, the categorization request can include a request for measurement and categorization criteria. An example of a format for the categorization request is shown below in Table 7. In various embodiments, the association response can be one message or multiple messages.

the additional wireless station transmits a categorization to the AP 102. The categorization typically sets forth the appropriate category that was identified at the block 610*b*. At block 614*b*, the AP 102 receives the categorization. At this point, the additional wireless station can be associated with the AP 102 and made a part of the wireless stations 104.

Figure 6C:
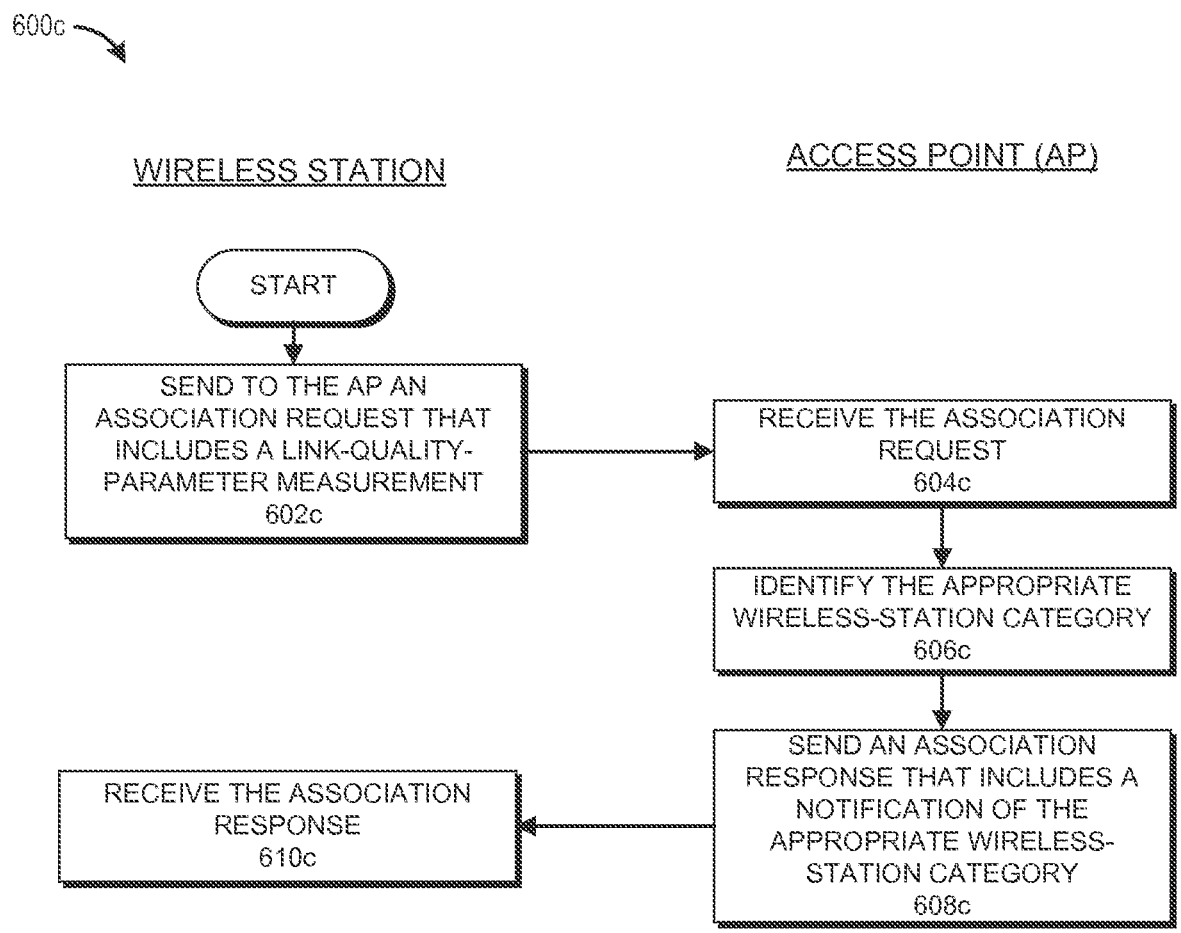
FIG. 6C illustrates an example of a process for interacting with an additional wireless station.

FIG. 6C illustrates an example of a process 600*c* for interacting with an additional wireless station for purposes of onboarding the additional wireless station to a wireless network. In various embodiments, the process 600*c* can be performed as all or part of the block 504 of FIG. 5. The process 600*c* can be implemented by any system that can access one or more data sources. For example, the process 600*c*, in whole or in part, can be implemented by one or more of the AP 102 and/or any of the wireless stations 104. The process 600*c* can also be performed generally by the wireless network 100. Although any number of systems, in whole or in part, can implement the process 600*c*, to simplify discussion, the process 600*c* will be described in relation to specific components of the wireless network 100.

At block 602*c*, the additional wireless station sends an association request to the AP 102 for purposes of joining the wireless network 100. The association request is typically responsive to a management frame such as, for example, the management frame transmitted at the block 502 of FIG. 5. For purposes of the process 600*c*, the management frame that is transmitted at the block 502 of FIG. 5 is typically of the form shown in Table 5. However, according to a predefined protocol, the management frame is treated as an implicit request for measurement of a particular link-quality parameter. Therefore, for purposes of the example of the process 600*c*, the association request includes a link-quality-parameter measurement pursuant to the implicit request for measurement.

At block 604*c*, the AP 102 receives the association request. At block 606*c*, the AP 102 identifies an appropriate category of the categories 106 for the additional wireless station. The identification can be based, at least in part, on the received link-quality-parameter measurement and categorization criteria maintained by the AP 102. In general, the identification of the appropriate category can be performed as described above with respect to FIGS. 1-2. At block 608*c*, the AP 102 sends to the additional wireless station an association response that includes a notification of the appropriate category. At block 610*c*, the wireless station

TABLE 7

| Field | Description/Examples |
|---|---|
| Element ID (Part 1) | The notification of AP power-saving mode may use a unique Element ID, for example, out of those reserved in IEEE 802.11 standards. |
| Length (Part 2) | Describes a number of octets in the information field (i.e. a length from Part 3 to Part 4). |
| Measurement Request (Part 3) | Each link-quality parameter can be assigned a unique parameter code. For example, if the AP is configured to use link margin as the link-quality parameter, this field can be set to a link-quality-parameter code corresponding to link margin. By way of further example, part 8 may include a measurement request such as, for example, a TPC request as defined in IEEE 802.11 standards, a new measurement request defined as an extension to IEEE 802.11 standards, etc. |
| Categorization Criteria (Part 4) | For example, if the AP determines categories based on a median value, the categorization criteria can be set to the median value or a value equivalent to the median value. |

At block 608*b*, the additional wireless station receives the association response. At block 610*b*, the additional wireless station identifies the appropriate category of the categories 106 based on the categorization criteria. In general, the identification of the appropriate category can be performed as described above with respect to FIGS. 1-2. At block 612*b*, receives the association response. At this point, the additional wireless station can be associated with the AP 102 and made a part of the wireless stations 104.

Figure 6D:
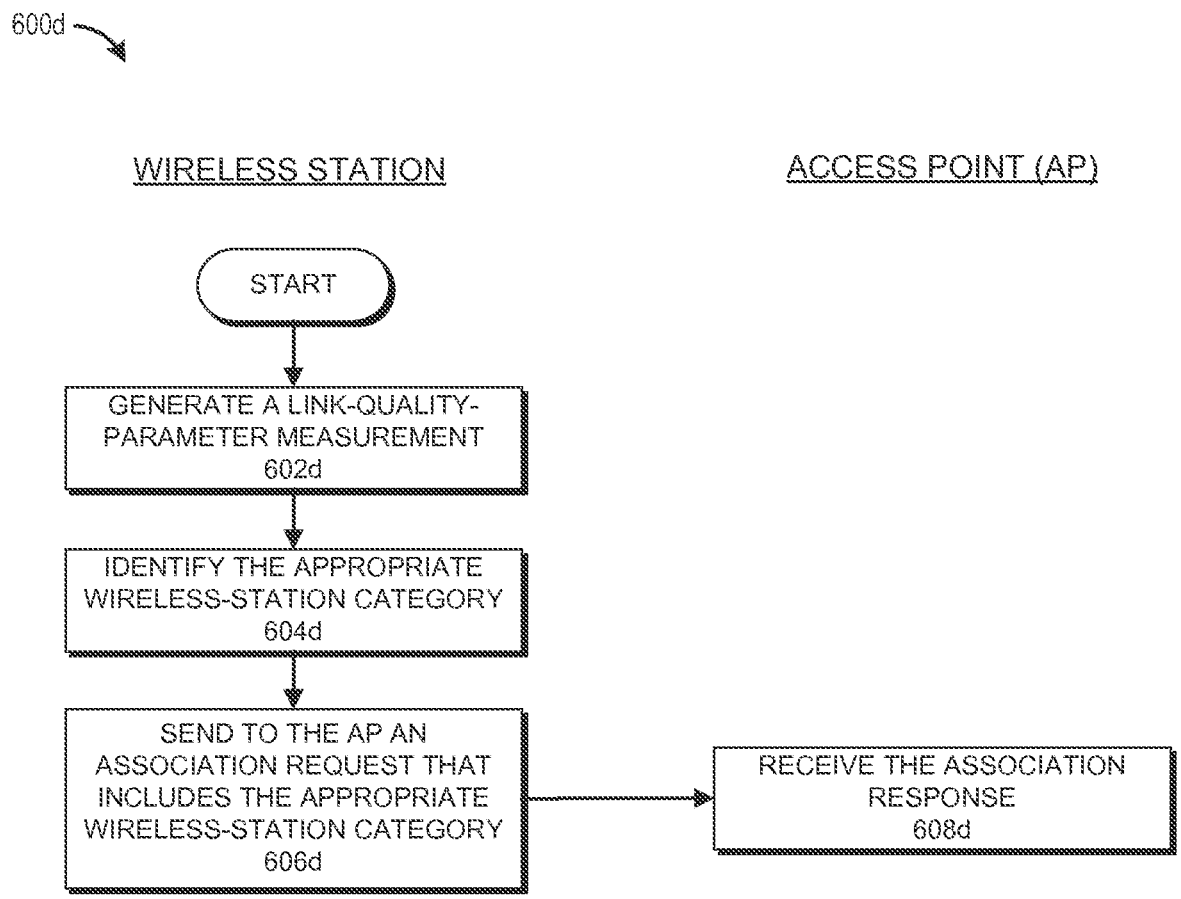
FIG. 6D illustrates an example of a process for interacting with an additional wireless station.

FIG. 6D illustrates an example of a process 600*d* for interacting with an additional wireless station for purposes of onboarding the additional wireless station to a wireless network. In various embodiments, the process 600d can be performed as all or part of the block 504 of FIG. 5. The process 600d can be implemented by any system that can access one or more data sources. For example, the process 600d, in whole or in part, can be implemented by one or more of the AP 102 and/or any of the wireless stations 104. The process 600d can also be performed generally by the wireless network 100. Although any number of systems, in whole or in part, can implement the process 600d, to simplify discussion, the process 600d will be described in relation to specific components of the wireless network 100.

At block 602d, the additional wireless station generates a link-quality-parameter measurement. In a typical embodiment, the block 602d is performed responsive to a management frame such as, for example, the management frame transmitted at the block 502 of FIG. 5. For purposes of the process 600d, the management frame that is transmitted at the block 502 of FIG. 5 is typically of the form shown in Table 6. In other words, the management frame generally includes a categorization request of the type described with respect to the block 606b of FIG. 6. Therefore, the block 602d can include generating the link-quality-parameter measurement according to a measurement request contained within the management frame.

At block 604d, the additional wireless station identifies an appropriate category of the categories 106 based, at least in part, on the link-quality-parameter measurement and categorization criteria contained within the management frame. In general, the identification of the appropriate category can be performed as described above with respect to FIGS. 1-2. At block 606d, the additional wireless station sends an association request to the AP 102 for purposes of joining the wireless network 100. For purposes of the example of the process 600d, the association request includes a categorization for the additional wireless station. The categorization typically sets forth the appropriate category as identified by the additional wireless station at the block 604d. At block 608d, the AP 102 receives the association request. At this point, the additional wireless station can be associated with the AP 102 and made a part of the wireless stations 104.

For illustrative purposes, the examples described above with respect to FIGS. 1-6D relate to categorizing wireless stations according to a link-quality parameter for purposes of reducing power consumption while minimizing collisions. However, it should be appreciated that the principles described above can also be used for numerous other purposes other than reducing power consumption.

For example, with reference to FIG. 1, the wireless stations of the second category 106(2) may be located near an edge of the wireless network 100 and easily affected by interference from adjacent wireless networks. In various embodiments, the AP 102 can instruct, for example, the wireless stations of the second category 106(2) to measure interference from adjacent wireless networks. In many cases, this can reduce a time and power consumption by the wireless stations of the first category 106(1). The AP 102 can collect, from the wireless stations of the second category 106(2), measurement data on interferences from the adjacent wireless networks. If, for example, the adjacent wireless networks are managed by a same operator as the wireless network 100, the collected measurement data on interferences from the adjacent wireless networks can be sent by the AP 102 to a network-management node in the operator's network.

The network-management node can analyze the collected measurement data and decide to request at least one of the adjacent wireless networks to reduce a maximum-allowed transmit power. In another example, assume that a second wireless network adjacent to the wireless network 100 has a same structure as the wireless network 100 as illustrated with respect to FIG. 1 and has two categories of wireless stations: a first category and a second category. The wireless stations of the second category in the second wireless network may be located near the edge of that network and be the main contributor to the interference with the wireless network 100. The AP of the second wireless network can be notified by the network-management node if the wireless network 100 suffers, for example, from severe interference. Thereafter, the AP of the second wireless network could instruct, for example, the wireless stations of the second category in the second wireless network to cease transmissions for at least a certain time period so as to reduce interference with the wireless network 100. In this case, the AP of the second wireless network can select an operation mode such as operation mode 2 or 5 described in Table 1.

Figure 7:
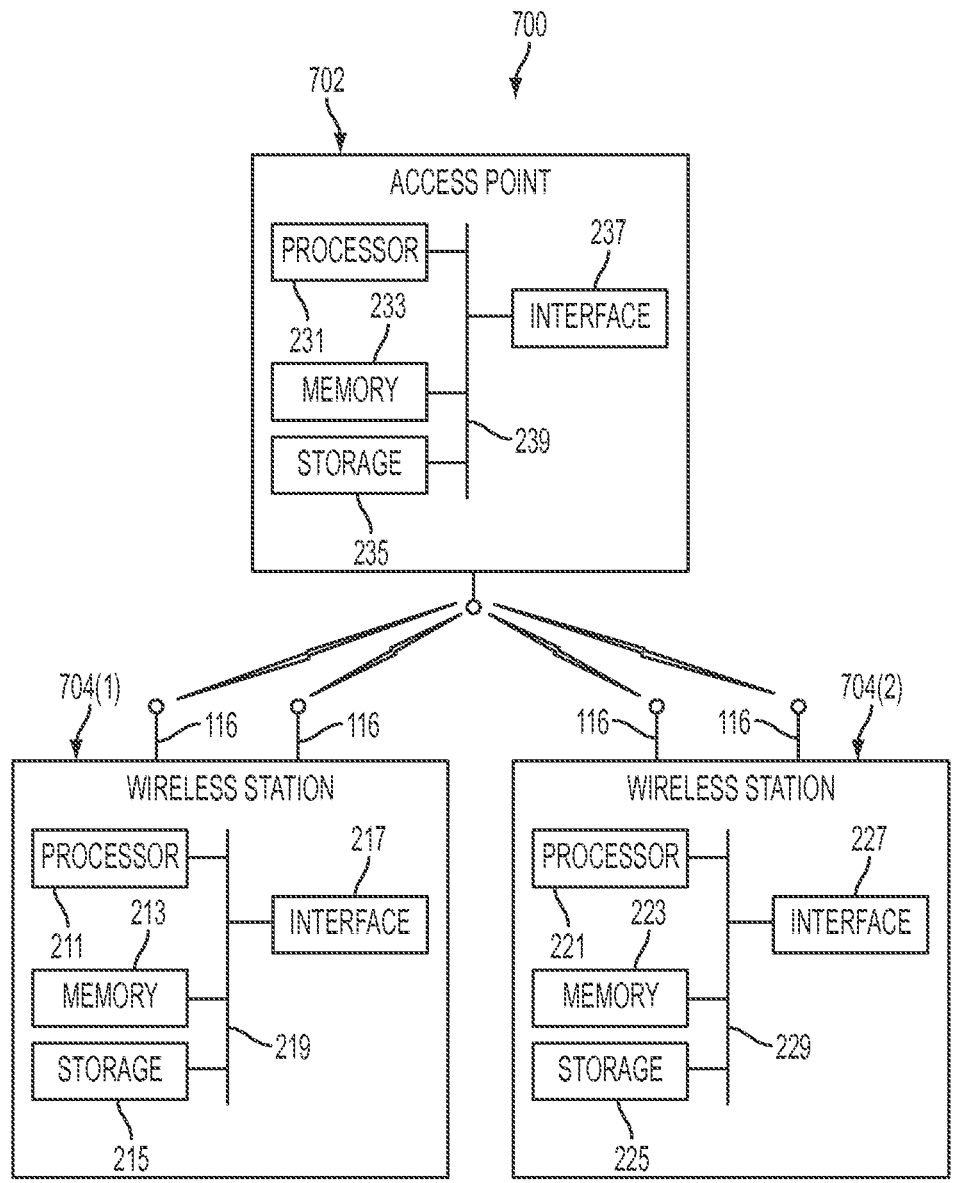
FIG. 7 depicts an example of a wireless network.

FIG. 7 depicts an example wireless network 700 including an example wireless station 704(1), an example wireless station 704(2), and an example access point 702. In general, wireless network 700 can perform functionality described, for example, with respect to the wireless network 100 of FIG. 1. For example, the AP 702 can perform functionality described with respect to the AP 102 of FIG. 1. In like fashion, the wireless station 704(1) and the wireless station 704(2) can each perform functionality attributed to any of the wireless stations 104 of FIG. 1. For illustrative purposes, the wireless network 700 is shown to include two wireless stations: the wireless station 704(1) and the wireless station 704(2). As described with respect to the wireless network 100 of FIG. 1, the wireless network 700 can include any number of wireless stations.

Wireless station 704(1), wireless station 704(2), and access point 702 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of wireless station 704(1), wireless station 704(2), and access point 702 may comprise any suitable physical form, configuration, number, type and/or layout. As an example, and not by way of limitation, wireless station 704(1), wireless station 704(2), and/or access point 702 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, wireless station 704(1), wireless station 704(2), and/or access point 702 may include one or more computer systems; be unitary or distributed; span multiple locations; span multiple machines; or reside in a cloud, which may include one or more cloud components in one or more networks.

In the depicted embodiment, wireless station 704(1), wireless station 704(2), and access point 702 each include their own respective processors 211, 221, and 231; memory 213, 223, and 233; storage 215, 225, and 235; interfaces 217, 227, and 237; and buses 219, 229, and 239. Although a particular wireless network is depicted having a particular number of particular components in a particular arrangement, this disclosure contemplates any suitable wireless network 700 having any suitable number of any suitable components in any suitable arrangement. For simplicity, similar components of wireless station 704(1), wireless station 704(2), and access point 702 will be discussed together while referring to the component of wireless station 704(1). However, it is not necessary for these devices to have the same components, or the same type of components. For example, processor 211 may be a general purpose microprocessor and processor 221 may be an application specific integrated circuit (ASIC).

Processor 211 may be a microprocessor, controller, or any other suitable computing device, resource, or combination of hardware, software and/or encoded logic operable to provide, either alone or in conjunction with other components, (e.g., memory 213) wireless networking functionality. Such functionality may include providing various features discussed herein. For example, processor 211 may determine an appropriate wireless-station category as described above. In particular embodiments, processor 211 may include hardware for executing instructions, such as those making up a computer program. As an example and not by way of limitation, to execute instructions, processor 211 may retrieve (or fetch) instructions from an internal register, an internal cache, memory 213, or storage 215; decode and execute them; and then write one or more results to an internal register, an internal cache, memory 213, or storage 215.

In particular embodiments, processor 211 may include one or more internal caches for data, instructions, or addresses. This disclosure contemplates processor 211 including any suitable number of any suitable internal caches, where appropriate. As an example and not by way of limitation, processor 211 may include one or more instruction caches, one or more data caches, and one or more translation lookaside buffers (TLBs). Instructions in the instruction caches may be copies of instructions in memory 213 or storage 215 and the instruction caches may speed up retrieval of those instructions by processor 211. Data in the data caches may be copies of data in memory 213 or storage 215 for instructions executing at processor 211 to operate on; the results of previous instructions executed at processor 211 for access by subsequent instructions executing at processor 211, or for writing to memory 213, or storage 215; or other suitable data. The data caches may speed up read or write operations by processor 211. The TLBs may speed up virtual-address translations for processor 211. In particular embodiments, processor 211 may include one or more internal registers for data, instructions, or addresses. Depending on the embodiment, processor 211 may include any suitable number of any suitable internal registers, where appropriate. Where appropriate, processor 211 may include one or more arithmetic logic units (ALUs); be a multi-core processor; include one or more processors 211; or any other suitable processor.

Memory 213 may be any form of volatile or non-volatile memory including, without limitation, magnetic media, optical media, random access memory (RAM), read-only memory (ROM), flash memory, removable media, or any other suitable local or remote memory component or components. In particular embodiments, memory 213 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 may include one or more memories 213, where appropriate. Memory 213 may store any suitable data or information utilized by wireless station 704(1), including software embedded in a computer readable medium, and/or encoded logic incorporated in hardware or otherwise stored (e.g., firmware). In particular embodiments, memory 213 may include main memory for storing instructions for processor 211 to execute or data for processor 211 to operate on. In particular embodiments, one or more memory management units (MMUs) may reside between processor 211 and memory 213 and facilitate accesses to memory 213 requested by processor 211.

As an example and not by way of limitation, wireless station 704(1) may load instructions from storage 215 or another source (such as, for example, another computer system) to memory 213. Processor 211 may then load the instructions from memory 213 to an internal register or internal cache. To execute the instructions, processor 211 may retrieve the instructions from the internal register or internal cache and decode them. During or after execution of the instructions, processor 211 may write one or more results (which may be intermediate or final results) to the internal register or internal cache. Processor 211 may then write one or more of those results to memory 213. In particular embodiments, processor 211 may execute only instructions in one or more internal registers or internal caches or in memory 213 (as opposed to storage 215 or elsewhere) and may operate only on data in one or more internal registers or internal caches or in memory 213 (as opposed to storage 215 or elsewhere).

In particular embodiments, storage 215 may include mass storage for data or instructions. As an example and not by way of limitation, storage 215 may include a hard disk drive (HDD), a floppy disk drive, flash memory, an optical disc, a magneto-optical disc, magnetic tape, or a Universal Serial Bus (USB) drive or a combination of two or more of these. Storage 215 may include removable or non-removable (or fixed) media, where appropriate. Storage 215 may be internal or external to wireless station 704(1), where appropriate. In particular embodiments, storage 215 may be non-volatile, solid-state memory. In particular embodiments, storage 215 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 may take any suitable physical form and may comprise any suitable number or type of storage. Storage 215 may include one or more storage control units facilitating communication between processor 211 and storage 215, where appropriate.

In particular embodiments, interface 217 may include hardware, encoded software, or both providing one or more interfaces for communication (such as, for example, packet-based communication) among wireless station 704(1), wireless station 704(2), access point 702, any networks, any network devices, and/or any other computer systems. As an example and not by way of limitation, communication interface 217 may include a network interface controller (NIC) or network adapter for communicating with an Ethernet or other wire-based network and/or a wireless NIC (WNIC) or wireless adapter for communicating with a wireless network.

In some embodiments, interface 217 comprises one or more radios coupled to one or more physical antenna ports 116. Depending on the embodiment, interface 217 may be any type of interface suitable for any type of network for which wireless network 700 is used. As an example and not by way of limitation, wireless network 700 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, wireless network 700 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. Wireless station 704(1) may include any suitable interface 217 for any one or more of these networks, where appropriate.

In some embodiments, interface 217 may include one or more interfaces for one or more I/O devices. One or more of these I/O devices may enable communication between a person and wireless station 704(1). As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 for them. Where appropriate, interface 117 may include one or more drivers enabling processor 211 to drive one or more of these I/O devices. Interface 117 may include one or more interfaces 117, where appropriate.

Bus 219 may include any combination of hardware, software embedded in a computer readable medium, and/or encoded logic incorporated in hardware or otherwise stored (e.g., firmware) to couple components of wireless station 704(1) to each other. As an example and not by way of limitation, bus 219 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 219 may include any number, type, and/or configuration of buses 219, where appropriate. In particular embodiments, one or more buses 219 (which may each include an address bus and a data bus) may couple processor 211 to memory 213. Bus 219 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 211 (such as, for example, one or more internal registers or caches), one or more portions of memory 213, one or more portions of storage 215, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Any suitable combination of various embodiments, or the features thereof, is contemplated. For example, any of the devices disclosed herein can include features of other embodiments. Thus, AP 102 may have any of the features described herein with respect to AP 702 and wireless station 104 may have any of the features described herein with respect to wireless station 704. As another example, any steps disclosed in a method herein may be used in other methods described herein. Thus, a step of one of the methods described in FIG. 2, 3, 4, 5, or 6A-6D may be used in any of the methods described in these Figures.

In one embodiment, a method is performed by an access point (AP). The method includes sending to at least one of a plurality of wireless stations a request for measurement of at least one link-quality parameter, receiving at least one link-quality-parameter measurement from the at least one of the plurality of wireless stations, and determining a plurality of wireless-station categories based, at least in part, on the received at least one link-quality-parameter measurement, the plurality of wireless-station categories including at least a first category and a second category. The method further includes communicating with the plurality of wireless stations in accordance with a transmission schedule corresponding to the plurality of wireless-station categories.

In a typical embodiment, the transmission schedule comprises a first time period and the transmission schedule disallows transmission of at least data frames by each wireless station of the second category during the first time period and the communicating comprises, during at least a portion of the first time period, transmitting a frame to a wireless station of the first category at an AP-transmission power level associated with the first category, the AP-transmission power level associated with the first category being distinct from an AP-transmission power level associated with the second category. The method further includes determining a length of the first time period and the transmission schedule comprises a second time period during which transmission of at least data frames by wireless stations of the first category is disallowed.

In a typical embodiment, the communicating comprises, during the first time period, transmitting a frame to a wireless station of the first category at an AP-transmission power level associated with the first category and the communicating comprises, during the second time period, transmitting a frame to a wireless station of the second category at an AP-transmission power level higher than the AP-transmission power level associated with the first category.

In a typical embodiment, the transmission schedule comprises a second time period during which transmission and reception of frames by wireless stations of the first category and the second category are allowed.

In a typical embodiment, the communicating comprises, during the first time period, transmitting a frame to a wireless station of the first category at an AP-transmission power level associated with the first category and the communicating comprises, during the second time period, transmitting a frame to a wireless station of the first category and transmitting a frame to a wireless station of the second category at an AP-transmission power level that is higher than the AP-transmission power level associated with the first category.

In a typical embodiment, the method further includes determining an adapted AP-transmission power level for each wireless-station category of the plurality of wireless-station categories, wherein the adapted AP-transmission power level determined for the first category is distinct from the adapted AP-transmission power level determined for the second category, and transmitting a frame to a wireless station of the first category using the adapted AP-transmission power level. In one embodiment, the AP-transmission power level associated with the second category is a normal AP-transmission power level that is higher than the AP-transmission power level associated with the first category. The method further includes notifying the plurality of wireless stations of the transmission schedule and wherein the plurality of wireless-station categories are defined by non-overlapping ranges of values of the at least one link-quality parameter.

In a typical embodiment, the method further includes interacting with an additional wireless station to identify, for the additional wireless station, an appropriate wireless-station category of the plurality of wireless-station categories and communicating with the additional wireless station in accordance with the transmission schedule. In a typical embodiment, the at least one link-quality parameter comprises at least one of a link margin, a channel power indicator, and a signal-to-noise indicator.

In a typical embodiment, the method further includes selecting one or more wireless-station categories of the plurality of categories, sending a request to at least one wireless station of at least one of the selected one or more wireless-station categories for an interference measurement, and receiving at least one interference measurement from the at least one wireless station. The selected one or more wireless-station categories include wireless stations deemed to be vulnerable to interference based on the link-quality-parameter measurement.

In a typical embodiment, determining of the plurality of wireless-station categories includes determining at least one categorization criterion relative to the at least one link-quality parameter and via the at least one criterion, identifying an appropriate wireless-station category of the plurality of wireless-station categories for each of the plurality of wireless stations. The method further includes for each wireless station of the plurality of wireless stations, notifying the wireless station of the appropriate wireless-station category.

In a typical embodiment, determining of the plurality of wireless-station categories includes determining at least one categorization criterion relative to the at least one link-quality parameter and notifying the plurality of wireless stations of the at least one categorization criterion so that each wireless station can identify an appropriate wireless-station category of the plurality of wireless-station categories. The determining of the plurality of wireless-station categories includes via the at least one categorization criterion, identifying an appropriate wireless-station category of the plurality of wireless-station categories for each of the plurality of wireless stations. The determining of the plurality of wireless-station categories further comprises includes receiving at least one confirmation message from at least one of the plurality of wireless stations indicating the appropriate wireless-station category of the at least one of the plurality of wireless stations and saving an appropriate wireless-station category of the plurality of wireless-station categories for each of the plurality of wireless stations based on the received at least one confirmation message.

In one embodiment, at least one of the plurality of wireless-station categories is assigned at least two of the plurality of wireless stations.

In one embodiment, an access point (AP) includes a transmitting/receiving unit and at least one processing unit, wherein the transmitting/receiving unit and the at least one processing unit are operable to implement a method, the method includes sending to at least one of a plurality of wireless stations a request for measurement of at least one link-quality parameter, receiving at least one link-quality-parameter measurement from the at least one of the plurality of wireless stations, determining a plurality of wireless-station categories based, at least in part, on the received at least one link-quality-parameter measurement, the plurality of wireless-station categories including at least a first category and a second category, and communicating with the plurality of wireless stations in accordance with a transmission schedule corresponding to the plurality of wireless-station categories.

In a typical embodiment, the transmission schedule comprises a first time period and the transmission schedule disallows transmission of at least data frames by each wireless station of the second category during the first time period and the communicating comprises, during at least a portion of the first time period, transmitting a frame to a wireless station of the first category at an AP-transmission power level associated with the first category, the AP-transmission power level associated with the first category being distinct from an AP-transmission power level associated with the second category.

In a typical embodiment, the method includes determining a length of the first time period and the transmission schedule comprises a second time period during which transmission of at least data frames by wireless stations of the first category is disallowed.

In one embodiment, the communicating includes during the first time period, transmitting a frame to a wireless station of the first category at an AP-transmission power level associated with the first category and during the second time period, transmitting a frame to a wireless station of the second category at an AP-transmission power level higher than the AP-transmission power level associated with the first category.

In a typical embodiment, the transmission schedule comprises a second time period during which transmission and reception of frames by wireless stations of the first category and the second category are allowed and the communicating comprises during the first time period, transmitting a frame to a wireless station of the first category at an AP-transmission power level associated with the first category and during the second time period, transmitting a frame to a wireless station of the first category and transmitting a frame to a wireless station of the second category at an AP-transmission power level that is higher than the AP-transmission power level associated with the first category.

In a typical embodiment, the method further includes determining an adapted AP-transmission power level for each wireless-station category of the plurality of wireless-station categories, wherein the adapted AP-transmission power level determined for the first category is distinct from the adapted AP-transmission power level determined for the second category, and transmitting a frame to a wireless station of the first category using the adapted AP-transmission power level. The AP-transmission power level associated with the second category is a normal AP-transmission power level that is higher than the AP-transmission power level associated with the first category.

In a typical embodiment, the method further includes notifying the plurality of wireless stations of the transmission schedule, wherein the plurality of wireless-station categories are defined by non-overlapping ranges of values of the at least one link-quality parameter. The method further includes interacting with an additional wireless station to identify, for the additional wireless station, an appropriate wireless-station category of the plurality of wireless-station categories and communicating with the additional wireless station in accordance with the transmission schedule. The at least one link-quality parameter includes at least one of a link margin, a channel power indicator, and a signal-to-noise indicator.

In a typical embodiment, the method further includes selecting one or more wireless-station categories of the plurality of categories, sending a request to at least one wireless station of at least one of the selected one or more wireless-station categories for an interference measurement, and receiving at least one interference measurement from the at least one wireless station. The selected one or more wireless-station categories include wireless stations deemed to be vulnerable to interference based on the link-quality-parameter measurement.

In a typical embodiment, the determining of the plurality of wireless-station categories comprises determining at least one categorization criterion relative to the at least one link-quality parameter, via the at least one criterion, identifying an appropriate wireless-station category of the plurality of wireless-station categories for each of the plurality of wireless stations, and further including for each wireless station of the plurality of wireless stations, notifying the wireless station of the appropriate wireless-station category.

In a typical embodiment, the determining of the plurality of wireless-station categories comprises determining at least one categorization criterion relative to the at least one link-quality parameter and notifying the plurality of wireless stations of the at least one categorization criterion so that each wireless station can identify an appropriate wireless-station category of the plurality of wireless-station categories. The determining of the plurality of wireless-station categories further includes via the at least one categorization criterion, identifying an appropriate wireless-station category of the plurality of wireless-station categories for each of the plurality of wireless stations, receiving at least one confirmation message from at least one of the plurality of wireless stations indicating the appropriate wireless-station category of the at least one of the plurality of wireless stations, and saving an appropriate wireless-station category of the plurality of wireless-station categories for each of the plurality of wireless stations based on the received at least one confirmation message.

In a typical embodiment, at least one of the plurality of wireless-station categories is assigned at least two of the plurality of wireless stations.

In a typical embodiment, computer-program product comprising a non-transitory computer-usable medium having computer-readable program code embodied therein, the computer-readable program code configured, when executed by at least one processor, to send to at least one of a plurality of wireless stations a request for measurement of at least one link-quality parameter, receive at least one link-quality-parameter measurement from the at least one of the plurality of wireless stations, determine a plurality of wireless-station categories based, at least in part, on the received at least one link-quality-parameter measurement, the plurality of wireless-station categories including at least a first category and a second category, and communicate with the plurality of wireless stations in accordance with a transmission schedule corresponding to the plurality of wireless-station categories.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method by a wireless station in a wireless network, the wireless network comprising an access point (AP) and a plurality of wireless stations associated with the AP, the method comprising:
    measuring, by the wireless station, at least a signal received from the Alto generate a link quality measurement;
    determining, by the wireless station, the wireless station as belonging to a first category based on the link quality measurement, wherein each of the plurality of wireless stations is identified as belonging to one of at least the first category and a second category defined by the AP;
    receiving, by the wireless station from the AP, information of a schedule comprising one or more first scheduled time periods and one or more second scheduled time periods, each of a first scheduled time period and a second scheduled time period comprising a time duration long enough for transmitting at least one data frame;
    during the one or more first scheduled time periods, transmitting, by the wireless station, user data to the AP and a collision avoidance control message related to the user data; and
    during the one or more second scheduled time periods, refraining, by the wireless station, from transmitting to the AP.

2. The method of claim 1, further comprising operating, by the wireless station, in one of a power saving mode and a sleep mode during the one or more second scheduled time periods.

3. The method of claim 2, wherein the one of a station power saving mode and a sleep mode is according to IEEE802.11.

4. The method of claim 1, wherein the transmitting step comprises transmitting the user data and the collision avoidance control message using an adapted transmission power level lower than a normal transmission power level, wherein the adapted transmission power level enables a transmitted frame to be received by the AP, and the normal transmission power level enables at least a header part of a transmitted frame to be received by the plurality wireless stations in a coverage area of the AP.

5. The method of claim 1, wherein the step of determining comprises:
    reporting, by the wireless station, the link quality measurement to the AP; and
    receiving, by the wireless station from the AP, a message indicating the wireless station is identified as belonging to the first category based on the reported link quality measurement.

6. The method of claim 1, wherein the step of determining comprises:
    receiving, by the wireless station from the AP, criteria for categorizing the wireless station; and
    identifying, using the criteria by the wireless station, the wireless station as belonging to the first category based on the generated link quality measurement.

7. The method of claim 1, wherein the information of the schedule further comprises a start time of the schedule and a number of counts of the first scheduled time period and the second scheduled time period.

8. The method of claim 1, wherein the collision avoidance control message comprises one of a RTS frame and a CTS frame according to IEEE802.11.

9. A wireless station in a wireless network, the wireless network comprising an access point (AP) and a plurality of wireless stations associated with the AP, the wireless station comprising:
    a transmitting/receiving unit; and
    at least one processing unit communicatively coupled to the transmitting/receiving unit, the at least one processing unit configured to:
        measure at least a signal received from the AP to generate a link quality measurement;
        determine the wireless station as belonging to a first category based on the link quality measurement, wherein each of the plurality of wireless stations is identified as belonging to one of at least the first category and a second category defined by the AP;
        receive, via the transmitting/receiving unit from the AP, information of a schedule comprising one or more first scheduled time periods and one or more second scheduled time periods, each of a first scheduled time period and a second scheduled time period comprising a time duration long enough for transmitting at least one data frame;
        during the one or more first scheduled time periods, transmitting, via the transmitting/receiving unit, user data to the AP and a collision avoidance control message related to the user data; and
        during the one or more second scheduled time periods, refrain from causing transmission to the AP.

10. The wireless station of claim 9, wherein the at least one processing unit is further configured to cause the wireless station to operate in one of a power saving mode and a sleep mode during the one or more second scheduled time periods.

11. The wireless station of claim 10, wherein each of the power saving mode and the sleep mode is according to IEEE802.11.

12. The wireless station of claim 9, wherein when transmitting the user data and the collision avoidance control message; the at least one processor is configured to:

transmit, via the transmitting/receiving unit, the user data and the collision avoidance control message using an adapted transmission power level lower than a normal transmission power level, wherein the adapted transmission power level enables a transmitted frame to be received by the AP, and the normal transmission power level enables at least a header part of a transmitted frame to be received by the plurality wireless stations in a coverage area of the AP.

13. The wireless station of claim 9, wherein when determining the wireless station as belonging to a first category, the at least one processor is configured to:

transmit, via the transmitting/receiving unit, the link quality measurement to the AP; and receive, via the transmitting/receiving unit from the AP, a message indicating the wireless station is identified as belonging to the first category based on the reported link quality measurement.

14. The wireless station of claim 9, wherein when determining the wireless station as belonging to a first category, the at least one processor is configured to:

receive, via the transmitting/receiving unit from the AP, criteria for categorizing the wireless station; and identify, using the criteria, the wireless station as belonging to the first category based on the generated link quality measurement.

15. The wireless station of claim 9, wherein the information of the schedule further comprises a start time of the schedule and a number of counts of the first scheduled time period and the second scheduled time period.

16. The wireless station of claim 9, wherein the collision avoidance control message comprises one of a RTS frame and a CTS frame according to IEEE802.11.

17. A non-transitory computer-readable storage medium including one or more instructions which, when executed by one or more processors, cause the one or more processors to at least perform the following:

measuring at least a signal received at a wireless station from an access point (AP) to generate a link quality measurement, the wireless station being in a wireless network, the wireless network comprising the access point (AP) and a plurality of wireless stations associated with the AP;

determining the wireless station as belonging to a first category based on the link quality measurement, wherein each of the plurality of wireless stations is identified as belonging to one of at least the first category and a second category defined by the AP, each of a first scheduled time period and a second scheduled time period comprising a time duration long enough for transmitting at least one data frame;

receiving, from the AP, information of a schedule comprising one or more first scheduled time periods and one or more second scheduled time periods;

during the one or more first scheduled time periods, transmitting user data to the AP and a collision avoidance control message related to the user data; and during the one or more second scheduled time periods, refraining from transmitting to the AP.

18. The non-transitory computer-readable storage medium of claim 17, wherein the one or more instructions cause the one or more processors to further perform:

operating the wireless station in one of a power saving mode and a sleep mode during the one or more second scheduled time periods.

19. The non-transitory computer-readable storage medium of claim 17, wherein the one or more instructions cause the one or more processors to perform transmitting the user data and the collision avoidance control message using an adapted transmission power level lower than a normal transmission power level, wherein the adapted transmission power level enables a transmitted frame to be received by the AP, and the normal transmission power level enables at least a header part of a transmitted frame to be received by the plurality wireless stations in a coverage area of the AP.

20. The non-transitory computer-readable storage medium of claim 17, wherein the information of the schedule further comprises a start time of the schedule and a number of counts of the first scheduled time period and the second scheduled time period.

* * * * *